(12) United States Patent
Xia et al.

(10) Patent No.: US 11,726,221 B2
(45) Date of Patent: Aug. 15, 2023

(54) SYSTEMS AND METHODS FOR IDENTIFYING DEPLOYED CABLES

(71) Applicant: Verizon Patent and Licensing Inc., Basking Ridge, NJ (US)

(72) Inventors: Tiejun J. Xia, Richardson, TX (US); Glenn A. Wellbrock, Wylie, TX (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 167 days.

(21) Appl. No.: 17/443,057

(22) Filed: Jul. 20, 2021

(65) Prior Publication Data

US 2023/0025986 A1 Jan. 26, 2023

(51) Int. Cl.
  *G01N 29/04* (2006.01)
  *G01V 1/00* (2006.01)
  *G01N 29/44* (2006.01)
  *G01V 1/22* (2006.01)
  *G01V 1/18* (2006.01)

(52) U.S. Cl.
  CPC .......... *G01V 1/001* (2013.01); *G01N 29/048* (2013.01); *G01N 29/4454* (2013.01); *G01V 1/18* (2013.01); *G01V 1/226* (2013.01); *G01N 2291/023* (2013.01); *G01V 2210/60* (2013.01)

(58) Field of Classification Search
  CPC .......... G01V 1/001; G01V 1/18; G01V 1/226; G01V 2210/60; G01N 29/048; G01N 29/4454; G01N 2291/023; G01H 9/004; G08G 1/04
  See application file for complete search history.

(56) References Cited

U.S. PATENT DOCUMENTS

| | | | |
|---|---|---|---|
| 2009/0037485 A1* | 2/2009 | Radel | G06Q 30/04 |
| 2015/0098673 A1* | 4/2015 | Barfoot | G01D 5/35338 |
| | | | 385/12 |
| 2020/0124735 A1* | 4/2020 | Huang | G01H 9/004 |
| 2021/0180997 A1* | 6/2021 | Huang | G01H 9/004 |

* cited by examiner

*Primary Examiner* — Suman K Nath

(57) ABSTRACT

In some implementations, a system may receive a cable map for a deployed cable. The system may receive vibration data indicating a vibration associated with a first section of the cable. The system may determine a characteristic associated with the first section of the cable based on the vibration. The system may determine a location associated with the characteristic based on the cable map. The system may determine that the first section of the cable is associated with the location based on the location being associated with the characteristic. The system may associate the location and a length of a second section of the cable extending from an initial location to the location. The system may receive an input identifying the length of the second section of the cable and may output the location based on associating the location and the length of the second section of the cable.

20 Claims, 17 Drawing Sheets

100

| Location ID | OTDR Distance from CO | Geographical Distance from CO | Point/Landmark | Location Data |
|---|---|---|---|---|
| A | 0 ft | 0 ft | Central Office | LatA, LongA |
| B | 300 ft | 100 ft | Road B | LatB, LongB |
| C | 800 ft | 650 ft | Road B x Road C | LatC, LongC |
| D | 2,000 ft | 1,750 ft | Road C x Road D | LatD, LongD |
| E | 2,800 ft | 2,300 ft | Road D x Road E | LatE, LongE |
| F | 3,300 ft | 2,900 ft | Road F X Rail Road Crossing | LatF, LongF |
| G | 4,600 ft | 3,500 ft | Road G x Bridge | LatG, LongG |
| ... | ... | ... | ... | ... |
| Z | 5,200 ft | 4,600 ft | Road Z x Tunnel | LatZ, LongZ |

FIG. 1L

| Location ID | OTDR Distance from CO | Geographical Distance from CO | Length of Coiled Cable | Location Data |
|---|---|---|---|---|
| S1 | 1,300 ft | 1,100 ft | 100 ft | LatS1, LongS1 |
| S2 | 3,100 ft | 3,100 ft | 80 ft | LatS2, LongS2 |
| ... | ... | ... | ... | ... |
| SN | 4,800 ft | 4,200 ft | 110 ft | LatSN, LongSN |

SYSTEMS AND METHODS FOR IDENTIFYING DEPLOYED CABLES

BACKGROUND

To maintain an integrity of deployed fiber cables, network service providers need to repair fiber cable problems in the field, such as a fiber cut, high loss splice points, tightly bending points, and/or the like. When a deployed fiber cable experiences a fault (e.g., a fiber cut), a field technician may be deployed to correct the issue. The field technician needs to identify a location of the fault quickly so that the field technician may travel to the location and correct the fault in the fiber cable.

BRIEF DESCRIPTION OF THE DRAWINGS

FIGS. 1A-1M are diagrams of an example associated with identifying locations of deployed cables.

DETAILED DESCRIPTION OF PREFERRED EMBODIMENTS

Figure 1A:
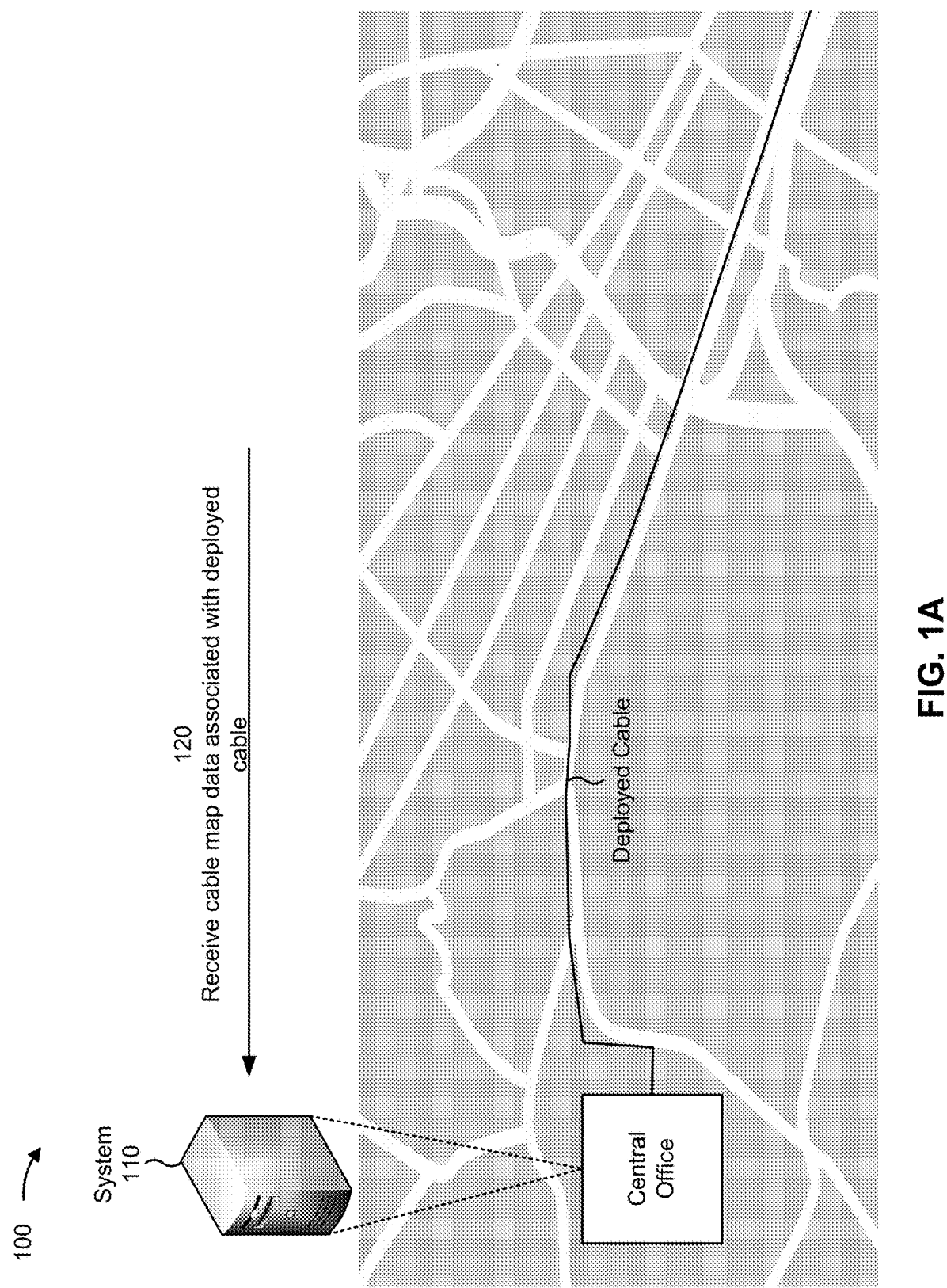

The following detailed description of example implementations refers to the accompanying drawings. The same reference numbers in different drawings may identify the same or similar elements.

Current techniques do not accurately identify locations of a deployed fiber cable. Thus, when a fault occurs in the fiber cable, a field technician may not quickly identify a location of the fault and may not quickly travel to the location and correct the fault in the fiber cable. Current techniques fail to identify locations of deployed fiber cable for several reasons. For example, to identify a location of a fault in a fiber cable, a technician may utilize an optical time- domain reflectometer (OTDR) to measure cable distance from a central office to the location of the fault. However, the cable distance measured by the OTDR fails to provide a geographical distance between the central office and the location of the fault. Moreover, the distance measured by the OTDR cannot be accurately correlated to a geographic location, because each deployed fiber cable may include uncertain amounts of localized path deviations or spare cable looping (e.g., a slack loop) along deployed routes. A difference between a geographic location derived from the OTDR-measured cable distance based on a route layout and the actual geographical location may be very large. Therefore, a lot of guesswork may be involved in identifying a particular location of a fault in a fiber cable, which results in wasted time in finding the right location to inspect/repair, as well as potential additional cost in destruction/reconstruction of areas around the fiber cable simply to identify the correct location of the fault. Thus, current techniques for identifying locations of deployed fiber cable waste computing resources (e.g., processing resources, memory resources, and/or communication resources, among other examples), networking resources, transportation resources, human resources, and/or the like associated with identifying an incorrect location of a fault in a fiber cable, traveling to the incorrect location, accessing the fiber cable underground at the incorrect location, re-identifying a correct location of the fault in the fiber cable, recovering lost network traffic, and/or the like.

U.S. patent application Ser. No. 16/813,269, titled "Systems and Methods for Determining Fiber Cable Geographic Locations," filed Mar. 9, 2020, the disclosure of which is considered part of and is incorporated by reference into this Patent Application, describes a measurement platform that may be used to identify locations of a deployed fiber cable based on vibrations generated by a vibration device along a deployed route of a fiber cable. However, in some cases, the time and/or manpower required to deploy the vibration device along the deployed route of the fiber cable may not be available and/or may not be performed prior to an occurrence of a fault.

Some implementations described herein provide a system for identifying locations of a deployed fiber cable based on vibrations caused by environmental characteristics (e.g., vibrations caused by vehicle traffic and/or weather, among other examples). For example, the system may receive, from a sensor device, vibration data. The vibration data may include cable distance data identifying one or more cable distances along the fiber cable to one or more vibrations experienced by the fiber cable and vibration data associated with the one or more vibrations experienced by the fiber cable.

In the event of an alarm condition (e.g., a fault) associated with the fiber cable, a sensor device may determine a cable distance to the alarm condition, and the system may receive data identifying the cable distance to the alarm condition. The system may determine a location of the alarm condition based on the correlated location data and using the data identifying the cable distance along the fiber cable to the alarm condition. The system may output the location of the alarm condition to a user device associated with a user (e.g., a technician).

In this way, the system may quickly identify a location of a fault in a fiber cable so that an action may be taken to avoid the fault and/or service the fault in the fiber cable. Thus, the system conserves computing resources (e.g., processing resources, memory resources, and/or communication resources, among other examples), networking resources, transportation resources, human resources, and/or the like that would otherwise have been utilized in identifying an incorrect location of a fault in a fiber cable, traveling to the incorrect location, re-identifying a correct location of the fault in the fiber cable, recovering lost network traffic, and/or the like.

FIGS. 1A-1M are diagrams of an example 100 associated with identifying locations of deployed cables. As shown in FIGS. 1A-1M, example 100 includes a system 110 and a sensor device 115. The system 110 may include one or more devices configured to identify locations of a deployed fiber cable based on vibrations experienced by the deployed cable, as described herein. The sensor device 115 may include an optical device, such as a distributed optical fiber sensing device (e.g., a Rayleigh scattering based distributed optical fiber acoustic sensing device), an optical reflectometry device (e.g., an optical time-domain reflectometry (OTDR) device), and/or a computer, among other examples, that may determine a length of the deployed cable from an initial location (e.g., a location of the sensor device 115 and/or the central office of a service provider associated with the deployed cable) to a vibration experienced by the deployed cable and may sense vibrations in the deployed cable caused by an environmental characteristic associated with the deployed cable.

As shown in FIG. 1A, and by reference number 120, the system 110 may receive cable map data associated with the deployed cable. The cable map data may correspond to a cable map indicating a route of the deployed cable within a geographical area (e.g., within a city, a neighborhood, and/or a region, among other examples). For example, the cable map data may include location information (e.g., geographical coordinates, such as a latitude and a longitude) indicating a geographic location of the deployed cable within the geographical area.

In some implementations, the cable map data may include additional information associated with the geographical area and/or the deployed cable. For example, the cable map data may include information identifying a set of points along the route of the deployed cable. The set of points may correspond to junction points connecting one section of cable with another section of cable, a location of an access panel, and/or a location of an access point for accessing the cable (e.g., a manhole), among other examples.

In some implementations, the additional information may include information indicating an environmental condition associated with a section of the geographical area. For example, the additional information may indicate a location of a traffic signal, a volume of traffic associated with a roadway, a location of a particular type of structure (e.g., a bridge, a school, a park, among other examples), and/or a location of a construction site, among other examples.

In some implementations, the cable map data may be input by a user via a user interface associated with the system 110. Alternatively, and/or additionally, the system 110 may receive (e.g., based on sending a request) the cable map data from another device (e.g., a server device of a network provider associated with the deployed cable and/or the sensor device 115, among other examples).

Figure 1B:
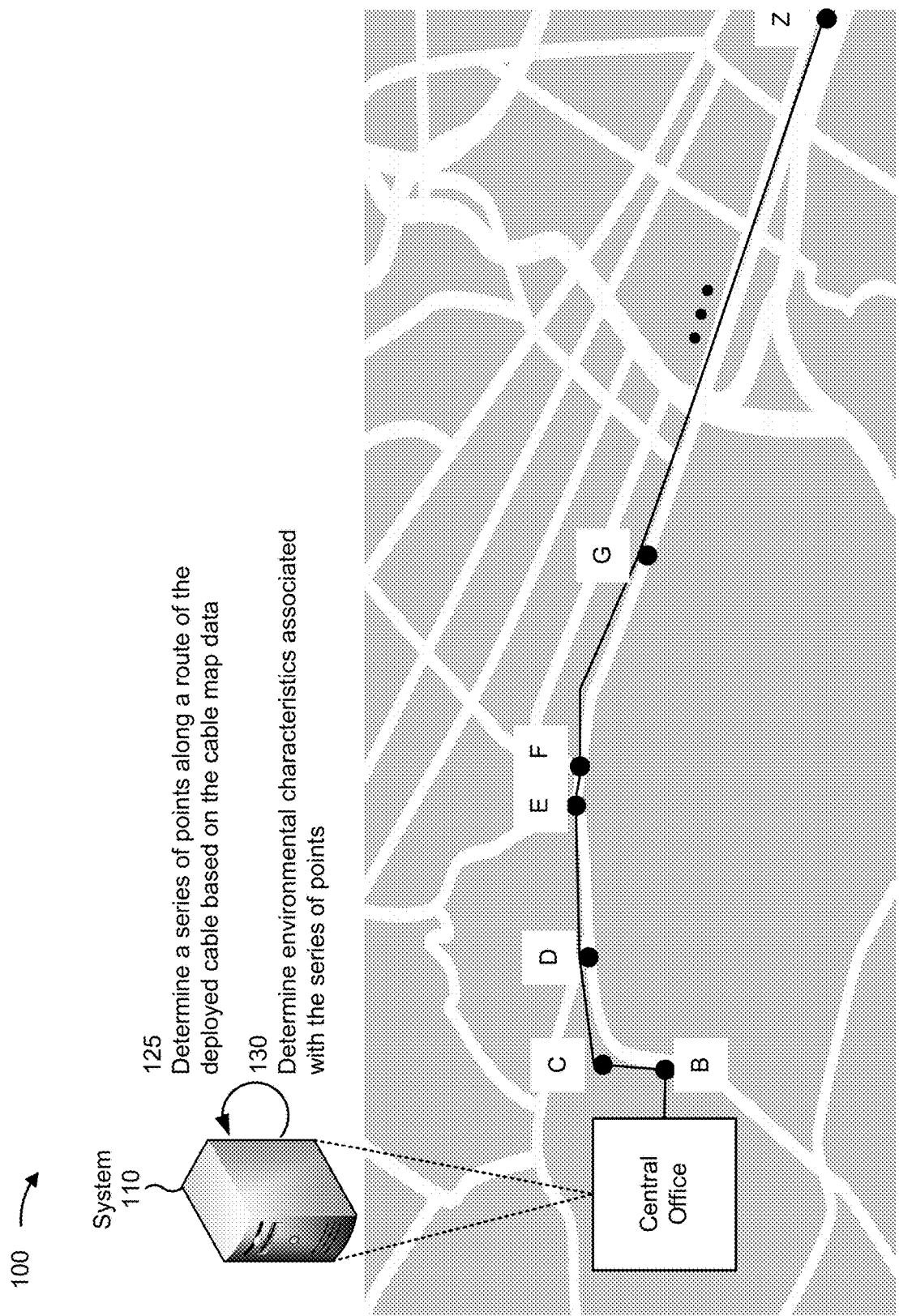

As shown in FIG. 1B, and by reference number 125, the system 110 may determine a series of points along a route of the deployed cable based on the cable map data. In some implementations, the series of points may correspond to the set of points indicated by the cable map data. The system 110 may determine the series of points along the route of the deployed cable based on extracting information associated with the set of points from the cable map data.

As shown by reference number 130, the system 110 may determine environmental characteristics associated with the series of points. In some implementations, the system 110 determines the environmental characteristics based on the cable map data. For example, the cable map data may include information identifying the environmental characters for a series of points along the route of the deployed cable. Alternatively, and/or additionally, the system 110 may determine the environmental characteristics based on user input. For example, a user may input (e.g., via a user interface associated with the system 110) information identifying environmental characteristics associated with one or more points along the route of the deployed cable.

Figure 1C:
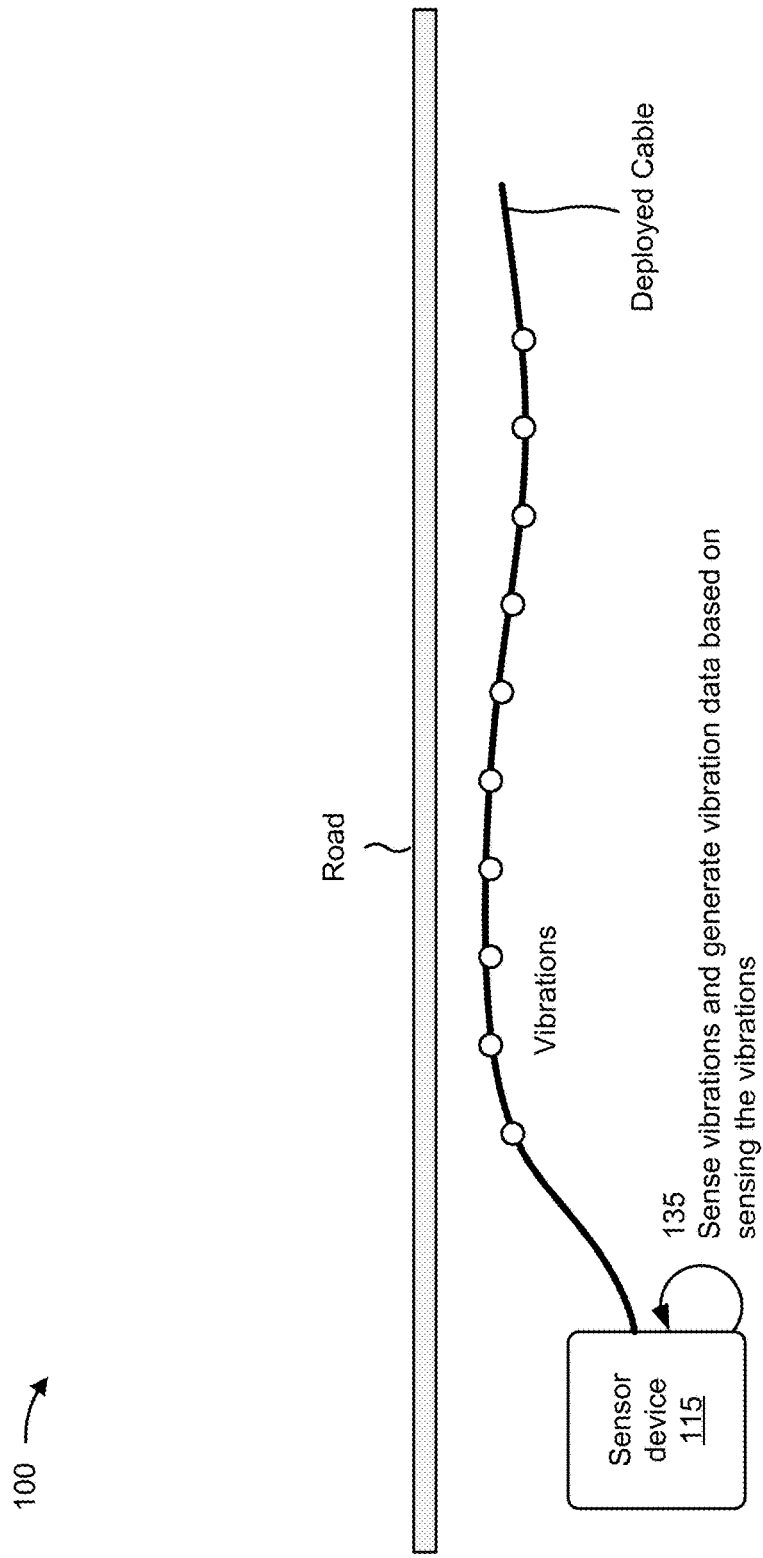

As shown in FIG. 1C, and by reference number 135, the sensor device 115 may sense vibrations experienced by the deployed cable and may generate vibration data based on sensing the vibrations. The sensor device 115 may detect a vibration generated by an environmental characteristic (e.g., a vehicle traveling along a roadway adjacent to the route of the deployed cable) and may generate vibration data indicating a vibration characteristic of the vibration experienced by the deployed cable (described in greater detail below).

In some implementations, the vibration data may include cable distance data indicating a length of cable extending from the sensor device 115 to the section of the deployed cable experiencing the vibration. The sensor device 115 may determine a distance along the deployed cable to the vibration. For example, the sensor device 115 may provide a first optical signal (e.g., light) to the deployed cable while a first vibration event is occurring, and the first optical signal may be (at least partially) reflected back to the sensor device 115 from a first location along the route of the deployed cable where the first vibration is experienced. The sensor device 115 may detect (using the distributed optical sensing device) the first optical signal reflected back from the first location to the sensor device 115 and may determine a first cable distance from the first location to a location of the sensor device 115 (e.g., based on the speed of light through the deployed cable and based on the first optical signal reflected back from the first location to the sensor device 115).

The sensor device 115 may provide a second optical signal to the deployed cable while a second vibration is being experienced by the deployed cable, and the second optical signal may be reflected back to the sensor device 115 from a second location along the route of the deployed cable where the second vibration is experienced. The sensor device 115 may detect the second optical signal reflected back from the second location to the sensor device 115, and may determine a second cable distance from the second location to the location of the sensor device 115. This process may repeat until cable distances are determined by the sensor device 115 for each point along the route of the deployed cable where vibrations are experienced.

The vibration and measurement process may be performed while communications traffic is being carried by the deployed cable, as the vibrations experienced by the fiber cable do not prevent the transmission of optical signals between the endpoints of the deployed cable. Moreover, no modifications need to be made to the surroundings of the deployed cable (e.g., excavation, unmounting, rehanging) or the cable itself (e.g., cutting, splicing) in order to obtain the reflected optical signals used for the cable distance measurement, as the vibrations experienced by the cable create the conditions for optical reflection (e.g., back scattering) that may be used by the distributed optical fiber sensing device to obtain the vibration data and/or to measure cable distance. In some implementations, the optical signals used to perform cable measurements may use wavelengths that are outside those used for carrying communications traffic. Thus, the cable location processes and systems described herein effectively obtain cable location data without impacting the operation of the cable or the environment around the cable.

Figure 1D:
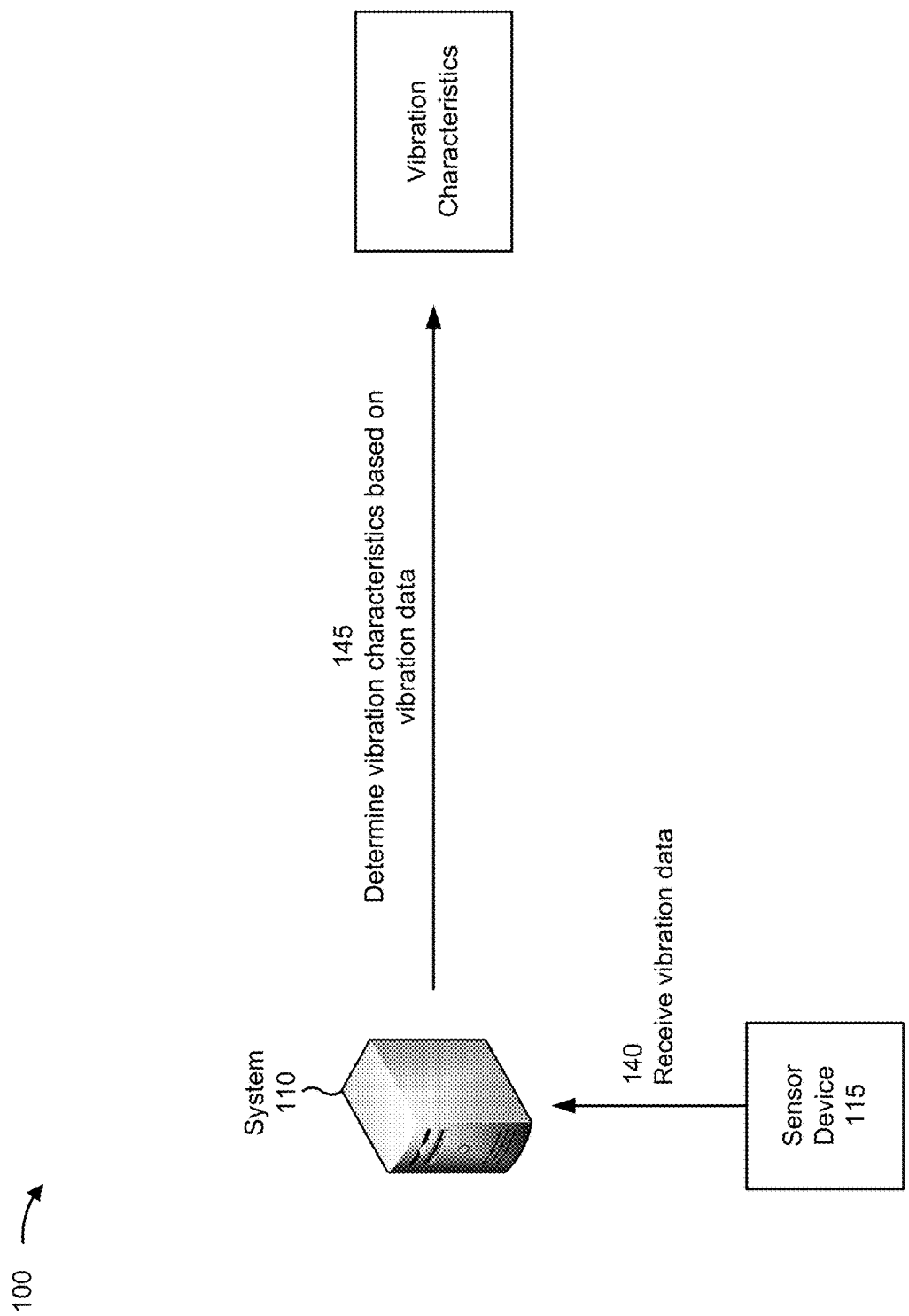

As shown in FIG. 1D, and by reference number 140, the system 110 may receive, for example, from the sensor device 115, vibration data. The vibration data may indicate a vibration characteristic of a vibration experienced by a section of the deployed cable and/or cable distance data identifying a corresponding length of a section of the deployed cable from an initial location (e.g., the location of the sensor device 115) to the vibration. In some implementations, the cable distance data may also include measurement identifiers (IDs) that identify, for example, a number of each of the measurements made on the deployed cable, and the data identifying corresponding cable distances from the location of the sensor device 115 to the vibration location may be associated with the measurement number. For example, the cable distance data may be represented as a table with a measurement ID field that includes entries for measurement IDs (measurement 1, 2, 3, . . . , N) and a vibration distance field that includes entries for corresponding cable distances along the deployed cable from the sensor device 115 to each detected vibration (e.g., 1,000 meters, 4,500 meters, 15,000 meters, and/or the like).

In some implementations, the system 110 may store vibration data in a data structure (e.g., a database, a table, a list, and/or the like) associated with the system 110. In some implementations, the vibration data is collected once by the sensor device 115, provided to the system 110, and stored in the data structure. Alternatively, if the route of the deployed cable is updated, the sensor device 115 may repeat the process described above in order to collect updated cable distance data for the deployed cable. The sensor device 115 may provide the updated cable distance data to the system 110, and the system 110 may update the vibration data stored in the data structure.

As shown by reference number 145, the system 110 may determine vibration characteristics based on the vibration data. In some implementations, the system 110 may determine the vibration characteristics based on providing the vibration data as an input to a machine learning model configured to generate an output indicating a vibration characteristic based on the vibration data.

In some implementations, the system 110 may train the machine learning model to determine the vibration characteristic. The machine learning model may be trained based on historical data relating to vibrations experienced by deployed cable and historical data relating to vibration characteristics with which the vibrations are associated. The machine learning model may be trained to determine, based on vibration data associated with a vibration experienced by a deployed cable, a vibration characteristic with which the vibration is associated and a confidence score that reflects a measure of confidence that the vibration characteristic is accurate for this vibration. In some implementations, the system 110 trains the machine learning model in a manner similar to that described below with respect to FIG. 2. Alternatively, and/or additionally, the system 110 may obtain a trained machine learning model from another device (e.g., a server device of a service provider associated with the deployed cable).

Figure 1E:
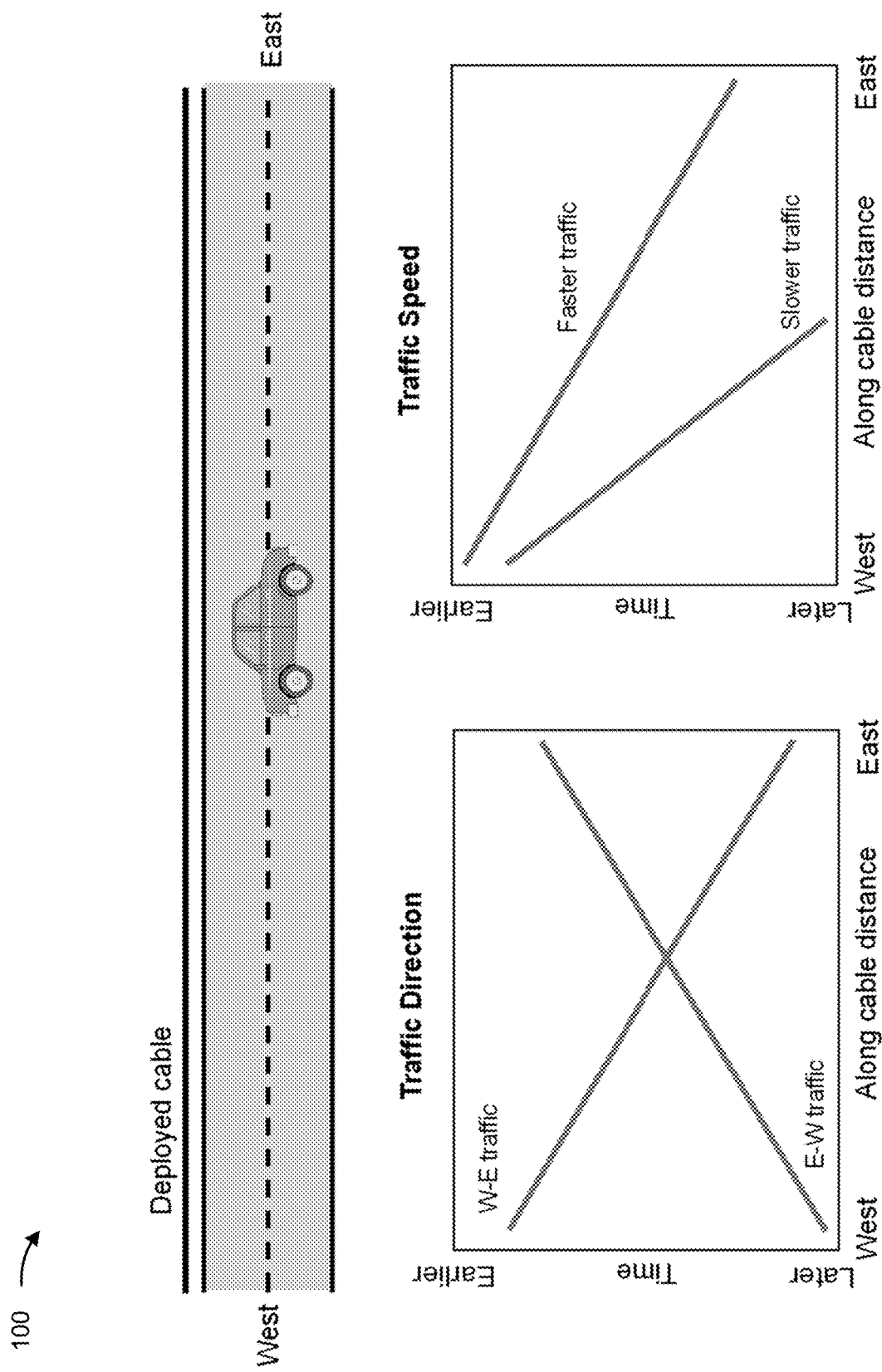

In some implementations, the system 110 may determine, based on the vibration data, that a vibration is associated with vibration characteristic associated with a direction of traffic along a roadway. For example, as shown in FIG. 1E, the system 110 may determine that a vibration is associated with vehicle traffic traveling in an east-west direction based on an increase (e.g., when the sensor device is positioned to the east of the location of the vibration) in cable distances associated with a series of vibrations experienced by the deployed cable over a time period. The system 110 may determine that a vibration is associated with vehicle traffic traveling in a west-east direction based on a decrease (e.g., when the sensor device is positioned to the east of the location of the vibration) in cable distances associated with a series of vibrations experienced by the deployed cable over a time period.

As further shown in FIG. 1E, the system 110 may determine a rate of speed of traffic traveling over a roadway along a section of deployed cable based on a length of time that a vibration is experienced by a section of the deployed cable. For example, the system 110 may determine a rate of speed of traffic based on an amount of time between a time at which a vibration is experienced at a first point along the deployed cable and a time at which a corresponding vibration is experienced at a second point along the deployed cable and a geographical distance between the first point and the second point.

Figure 1F:
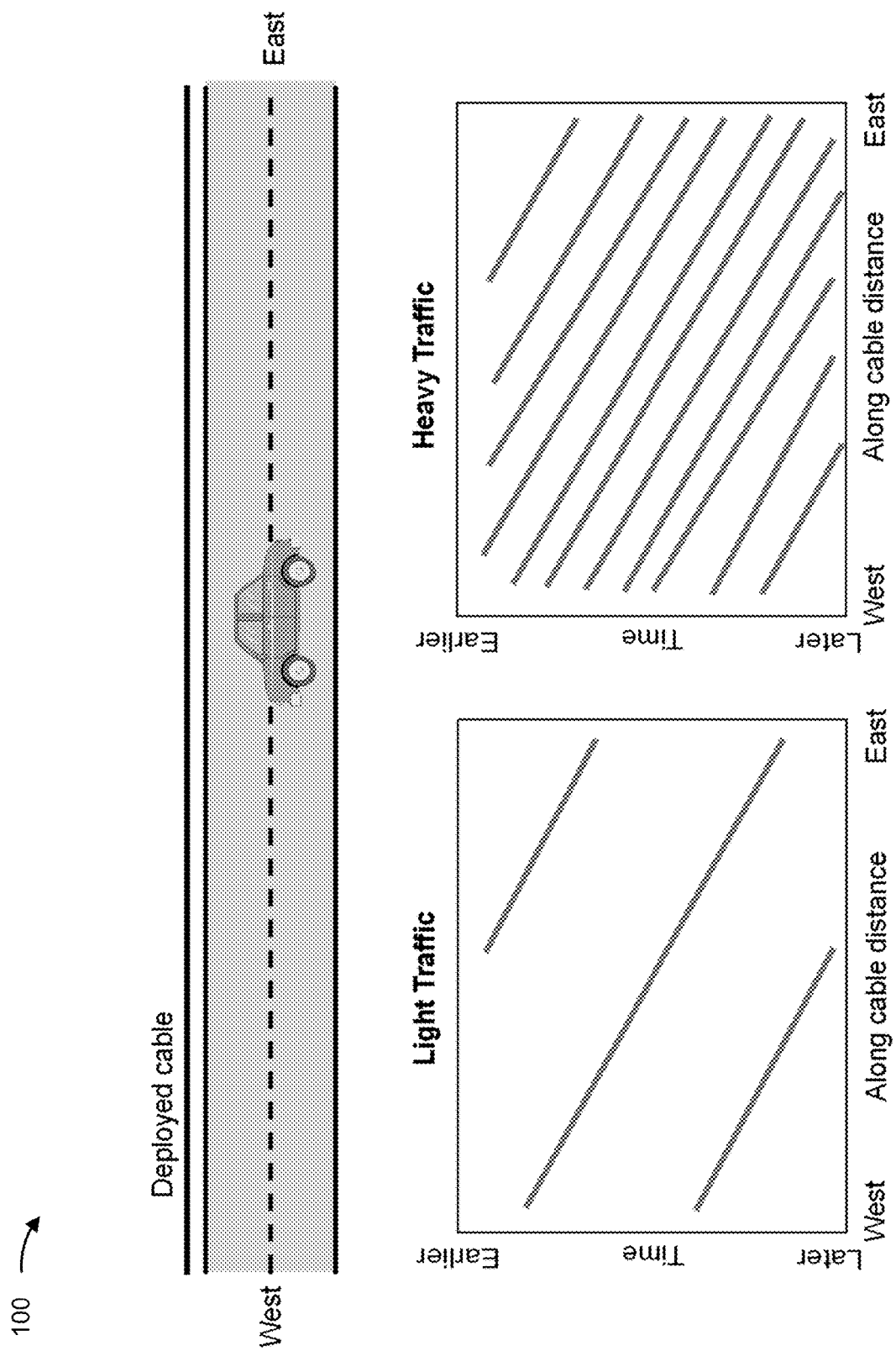

In some implementations, the vibration characteristic may be associated with a volume of vehicular traffic. For example, as shown in FIG. 1F, the system 110 may determine a volume of traffic associated with a section of the deployed cable based on a frequency at which a series of vibrations are experienced by the section of the deployed cable.

Figure 1G:
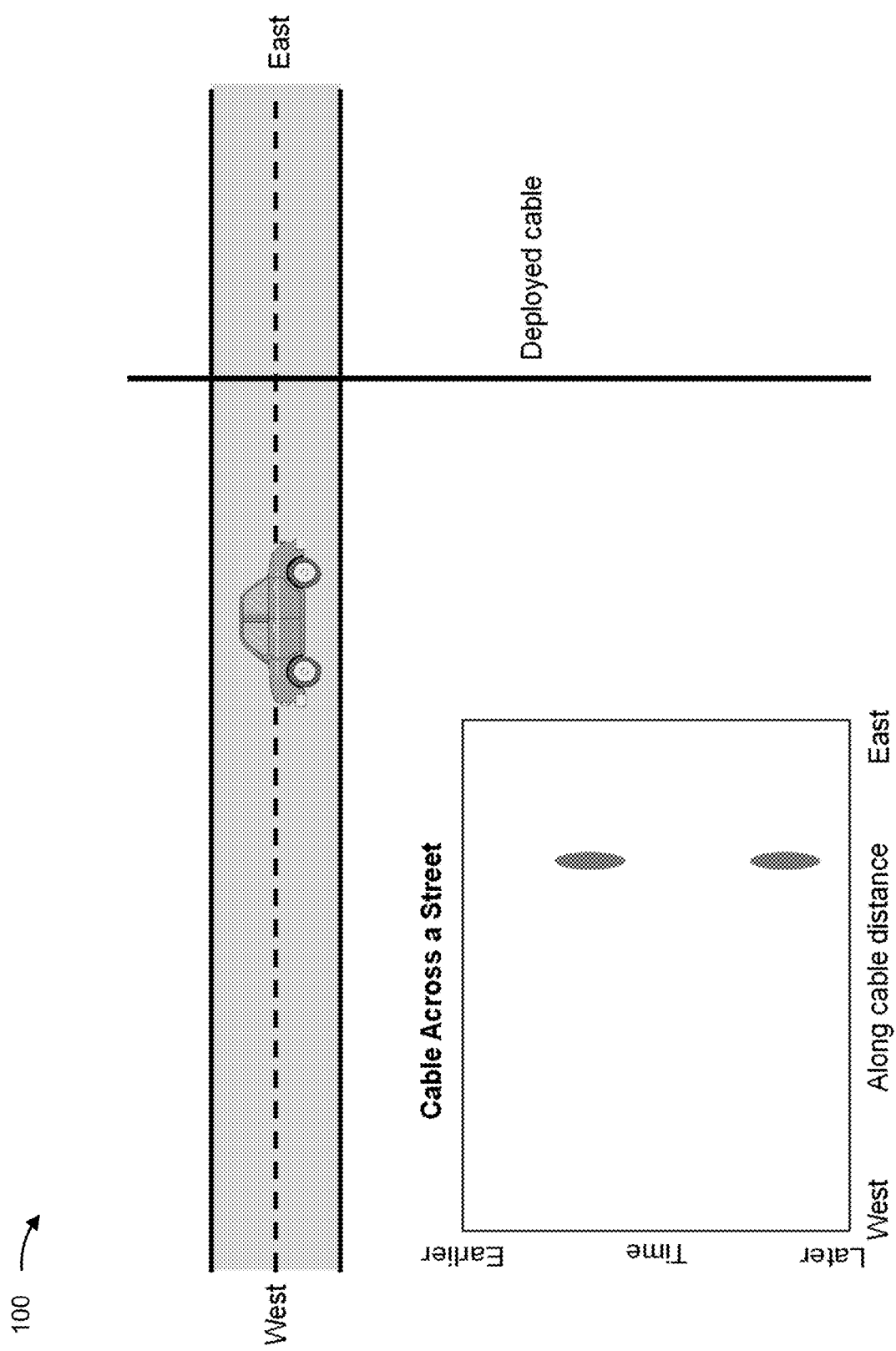

In some implementations, the vibration characteristic may be associated with the deployed cable extending across and/or under a roadway. For example, as shown in FIG. 1G, the system 110 may determine that a vibration is associated with a vibration characteristic indicating that the deployed cable extends across and underneath a roadway based on the vibration data indicating a series of pulses of vibrations at a particular point along the section of the deployed cable.

Figure 1H:
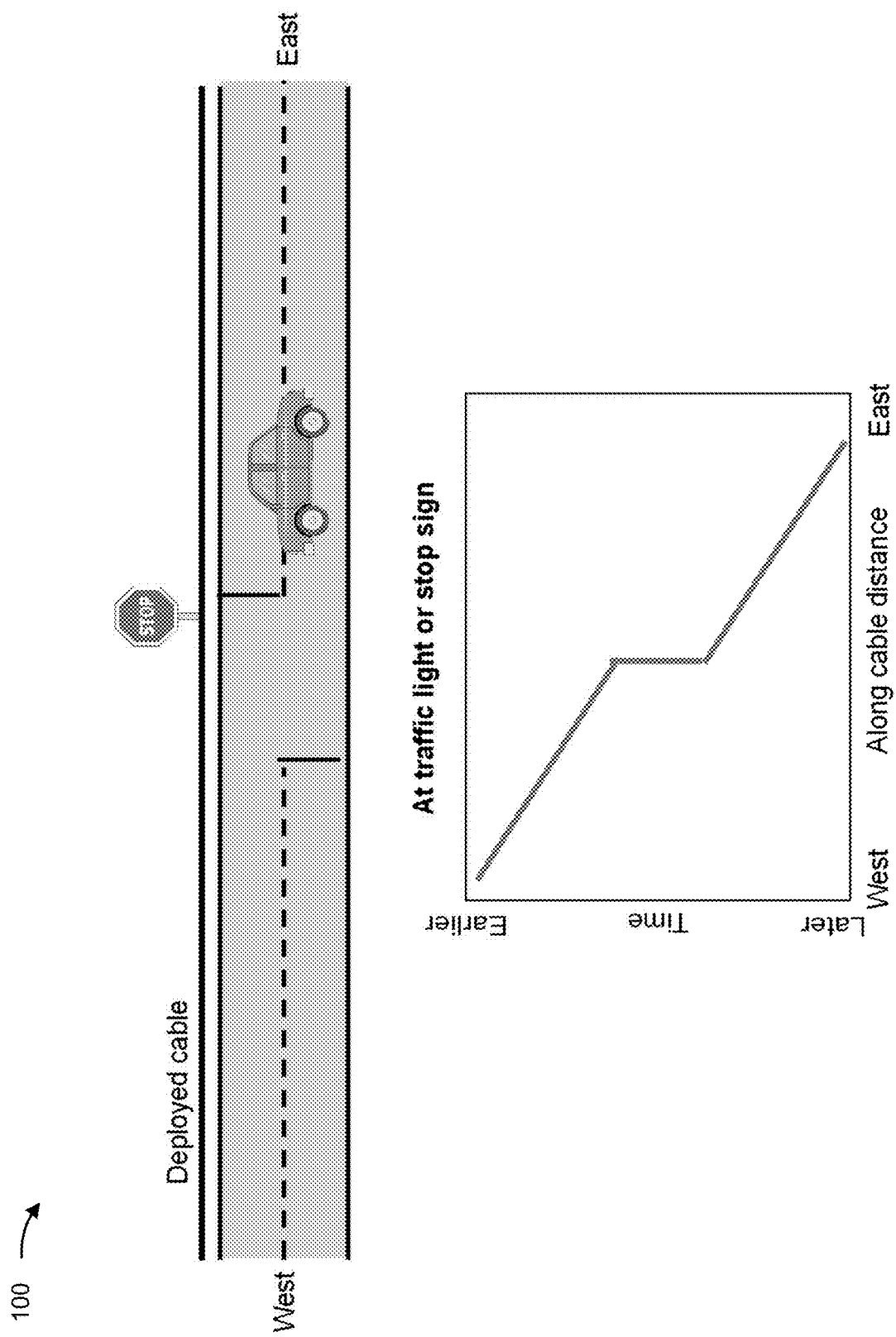
Figure 11:
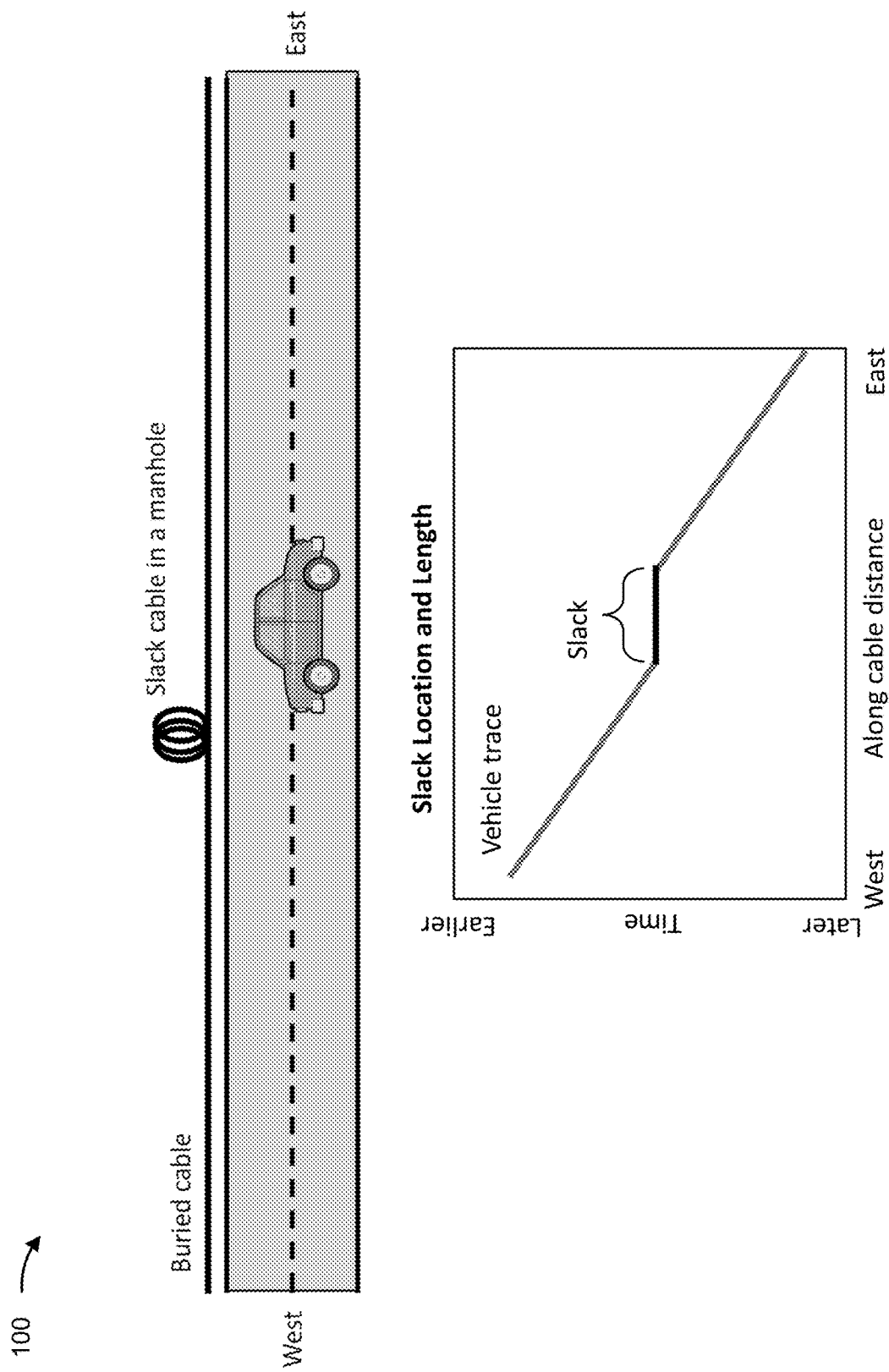

In some implementations, the vibration characteristic may be associated with a traffic signal. For example, as shown in FIG. 1H, the system 110 may determine that a vibration is associated with a vibration characteristic indicating a presence of a traffic signal based on the vibration data indicating that the vibration is experienced by adjacent portions of the section of the deployed cable, followed by a particular portion of the section of the deployed cable experiencing the vibration for a time period, followed by the vibration being experienced by a series of portions adjacent to the particular portion of the section of the deployed cable.

In some implementations, the vibration characteristic may be associated with a presence of a slack loop. For example, as shown in FIG. 1I, the system 110 may determine that a vibration is associated with a vibration characteristic indicating a presence of a slack loop based on the vibration data indicating that the vibration is experienced by adjacent portions of the section of the deployed cable, followed by a set of adjacent portions of the section of the deployed cable experiencing the vibration at a same time, followed by the vibration being experienced by a series of portions adjacent to the set of adjacent portions of the section of the deployed cable.

Figure 1J:
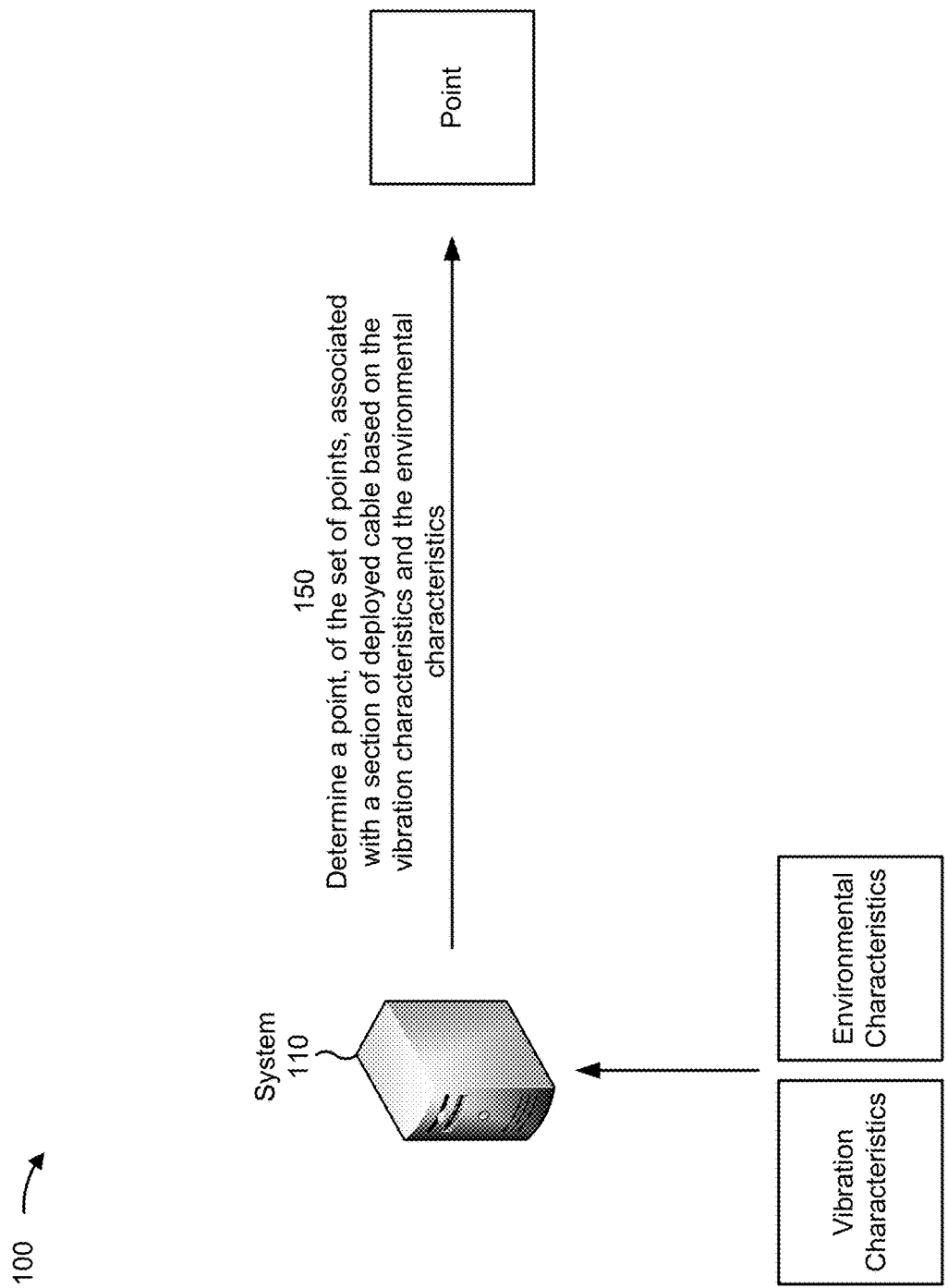

As shown in FIG. 1J, and by reference number 150, the system 110 may determine a point, of the set of points, associated with a section of deployed cable based on the vibration characteristics and the environmental characteristics. As an example, the vibration characteristic may indicate a presence of a traffic signal. The system 110 may determine a point along the route of the deployed cable at which a traffic signal is present. For example, the system 110 may determine the point based on additional information that is included in the cable map data and that indicates that a traffic signal is located at a particular point along the route of the deployed cable.

In some implementations, the system 110 determines a point along the route of the deployed cable based on a difference between a vibration pattern of a vibration experienced by a first section of the deployed cable and a vibration pattern of a vibration experienced by a second section of the deployed cable that is adjacent to the first section. As an example, a first section of the deployed cable may be deployed underground (e.g., may be a buried cable). At a particular point, the first section of the deployed cable may connect to a second portion of the deployed cable. The second portion of the deployed cable may be deployed above ground (e.g., may be a suspended cable).

The system 110 may determine that a vibration characteristic associated with a vibration experienced by the first section of the deployed cable is associated with a buried cable adjacent to a roadway experiencing a volume of traffic at a particular rate of speed. The system 110 may determine that a vibration characteristic associated with a vibration experienced by the second section of the deployed cable is associated with a suspended cable experiencing vibrations caused by wind and/or another environmental condition.

In some implementations, the system 110 may determine that the first section of the deployed cable is adjacent to the second section of the deployed cable based on the cable distances associated with the vibrations experienced by the first and second sections of the deployed cable. The system 110 may identify a location at which the deployed cable transitions from being deployed underground to being deployed above ground based on the cable map data. The system 110 may determine that the identified location corresponds to a point on the deployed cable at which an end of the first section of the deployed cable is adjacent to an end of the second section of the deployed cable.

Figure 1K:
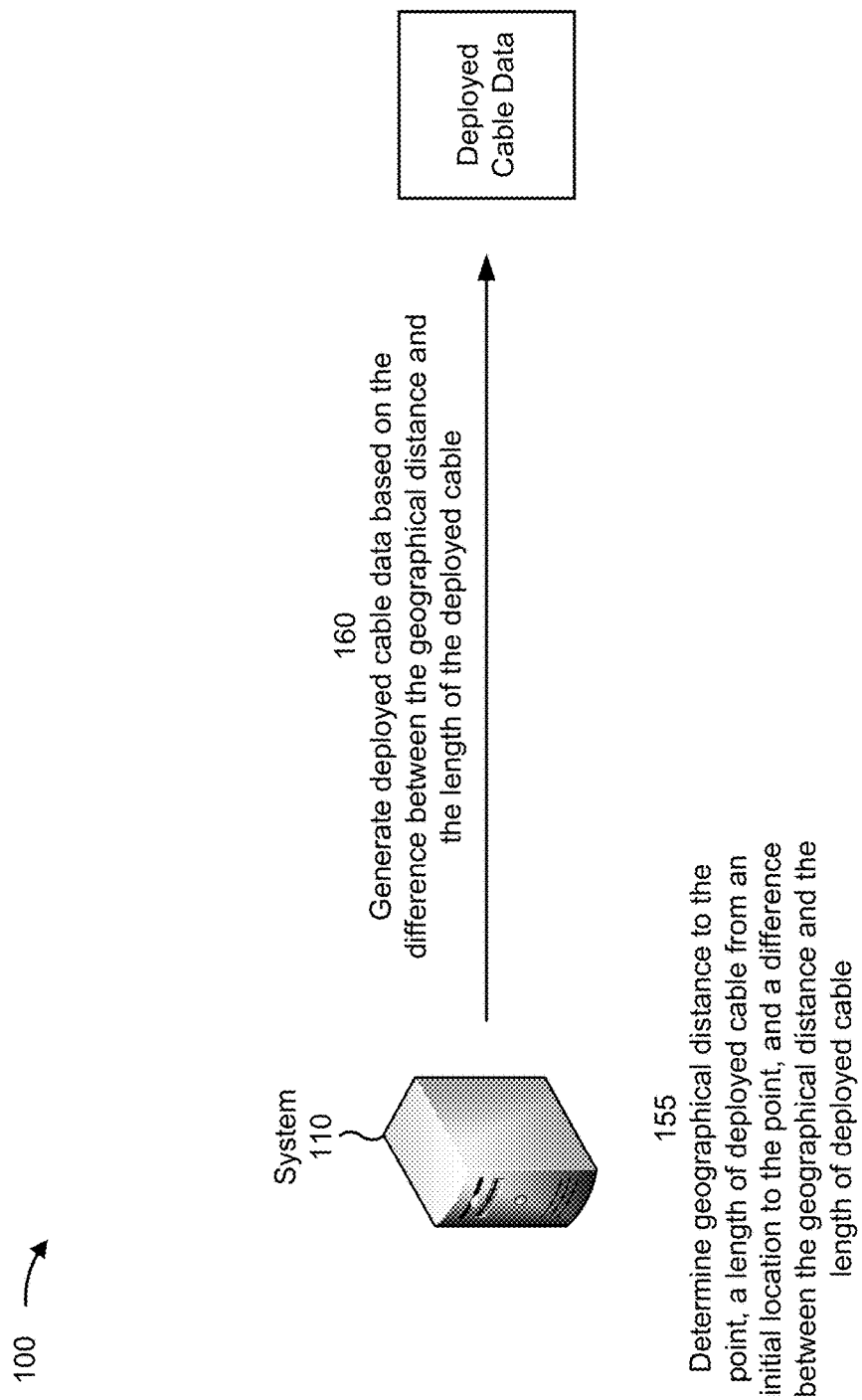

As shown in FIG. 1K, and by reference number 155, the system 110 may determine a geographical distance to the point, a length of deployed cable from an initial location to the point, and a difference between the geographical distance to the point and the length of deployed cable. The system 110 may determine the geographical distance to the point based on the cable map data. For example, the cable map data may include additional information indicating the location of the point associated with an environmental characteristic corresponding to the vibration characteristic.

The system 110 may determine a length of the deployed cable from an initial location (e.g., a location of the sensor device 115) to the point based on the vibration data. For example, the vibration data may include cable distance data indicating a length of the deployed cable from the initial location to the location of the section of the deployed cable experiencing the vibration from which the vibration characteristic was determined. The system 110 may determine the difference between the geographical distance and the length of the deployed cable based on subtracting the geographical distance from the length of the deployed cable.

The difference may indicate an amount of additional cable used to deploy the cable from the initial location to the location at which the vibration was experienced. For example, the different may correspond to a length of the deployed cable included in a slack loop at an access panel located along the section of the deployed cable. In some implementations, the system 110 may determine a length of the deployed cable included in a plurality of slack loops. For example, the system 110 may identify a plurality of points, of the set of points indicated by the cable map data, that are associated with a respective slack loop. In some implementations, the cable map data may indicate that the plurality of points are associated with the slack loops. In some implementations, the system 110 may determine that the plurality of points are associated with the slack loops based on the plurality of points being associated with a junction and/or an access panel, among other examples. The system 110 may determine a length of the deployed cable included in each slack loop, of the plurality of slack loops, in a manner similar to that described above.

As shown by reference number 160, the system 110 may generate deployed cable data based on the difference between the geographical distance and the length of the deployed cable. The system 110 may generate the deployed cable data based on correlating the cable distance data, the difference between the geographical distance and the length of the deployed cable, and/or the location data associated with the point. For example, as shown in FIG. 1L, the deployed cable data may be represented as a table. The table may include, for each point experiencing a vibration and/or indicated in the cable map data, a location ID associated with the point, a length of the deployed cable from the initial location to the location of the point (e.g., an OTDR distance from the central office to the point, as shown in FIG. 1L), a geographical distance from the initial location to the location of the point (e.g., a geographical distance from the central office to the point, as shown in FIG. 1L), information for enabling a user to identify the point (e.g., a name of a building located at the location of the point, a landmark associated with the point, and/or information identifying an intersection of two roadways at the location of the point, among other examples), and/or location data indicating the location of the point.

The system 110 may store cable map data in the data structure associated with system 110. In some implementations, the cable map data is determined once by the system 110 and stored in the data structure. Alternatively, if the route of the deployed cable is updated or modified, the sensor device 115 may repeat the process described above in order to collect updated vibration data for the deployed cable. The sensor device 115 may provide the updated vibration data to the system 110. The system 110 may obtain updated cable map data and may generate updated deployed cable data in a manner similar to that described above.

In some implementations, as shown in FIG. 1M, the deployed cable data may include information associated with slack loops present along the deployed cable. As shown, the information associated with a slack loop may include a location ID associated with the slack loop, a length of deployed cable from an initial location (e.g., a location of the sensor device 115) to a location of the slack loop (e.g., an OTDR distance from the central office, as shown in FIG. 1M), a geographical distance from the initial location to the location of the slack loop, a length of coiled cable included in the slack loop (e.g., the difference between the geographical distance and the length of the deployed cable), and location data indicating a geographical location of the slack loop.

In some implementations, the system 110 may update a cable map associated with the cable map data to include the deployed cable data. For example, the system 110 may update the cable map to show the geographical distance to each point, of the series of points, identified along the route of the deployed cable, the OTDR distance from the initial point to each point, the location of a slack loop, and/or a length of coiled cable included in a slack loop, among other examples.

In some implementations, an alarm condition may occur in the deployed cable. The alarm condition may be a result of a cut in the deployed cable, a high loss splice point, and/or a tightly bending point, among other examples, associated with the deployed cable. For purposes of this example, if different cable distances along the deployed cable are labeled "A" through "Z" (e.g., as shown in FIG. 1B), the alarm condition may occur at a cable distance (e.g., from the sensor device 115 and/or the central office) nearby a location labeled "C." The alarm condition may be detected by a network device (e.g., a network provider server) that manages a network associated with the deployed cable.

In some implementations, as a result of the alarm condition, the sensor device 115 may be activated to determine a cable distance along the deployed cable to the cause of the alarm condition. For example, the sensor device 115 may provide an optical signal to the deployed cable, and the cause of the alarm condition (e.g., a displacement or a fiber cut) associated with the deployed cable may cause the optical signal to be reflected back to the sensor device 115 from a location of the alarm condition. The sensor device 115 may detect the optical signal reflected back from the location of the alarm condition to the sensor device 115, and may determine a cable distance from the location of the alarm condition to a location of the sensor device 115. In this example, the measurement may be determined to be 800 feet (e.g., as shown in FIG. 1L).

The system 110 may receive, from the sensor device 115, data identifying the cable distance along the fiber cable to the alarm condition. For example, the system 110 may receive data identifying the detected cable distance from the location of the sensor device 115 (e.g., the location of the central office) to the cause of the alarm condition associated with the deployed cable. In this example, the measurement of 800 feet may be provided to the measurement platform.

In some implementations, the system 110 may determine a location of the alarm condition based on the deployed cable data. Continuing with the current example, where the cable distance along the fiber cable to the alarm condition is determined to be 800 feet, the system 110 may use the deployed cable data to determine a geographical location closest to the alarm condition—in this case, "Road B x Road C" (e.g., the intersection of road B and road C). In some implementations, the system 110 may also provide a geographical distance from the location (CO) of the sensor device 115 to the geographical location closest to the alarm condition (e.g., 650 feet, as shown in FIG. 1L).

In some implementations, based on the determined geographic location of the cause of the alarm condition, the system 110 may perform one or more actions. In some implementations, the one or more actions include the system 110 determining directions (e.g., a navigation route) to the cause of the alarm condition based on the location of the alarm condition. For example, if system 110 determines that the alarm condition is located at the intersection of road B and road C, the system 110 may calculate directions to the alarm condition, for example, from the central office, a nearby service center, or another starting point. In this way, system 110 may quickly provide directions to a technician and/or a vehicle for repairing the deployed cable, which conserves resources that would otherwise have been utilized in manually determining directions to the technician and/or the vehicle, causing the technician and/or the vehicle to travel based on potentially incorrect directions, and/or the like.

In some implementations, the one or more actions include the system 110 causing a vehicle to be dispatched for servicing the deployed cable. For example, the system 110 may cause an autonomous automobile (e.g., a car, a truck, a van, and/or the like) to be dispatched for servicing the deployed cable. In this way, system 110 may utilize existing land routes and infrastructure to service the deployed cable, thereby conserving resources (e.g., computing resources, networking resources, and/or the like) that would otherwise have been utilized in scheduling a repair service, assigning a technician for the repair service, and/or the like.

In some implementations, the one or more actions include the system 110 causing an airborne autonomous vehicle to be dispatched for servicing the deployed cable. For example, system 110 may cause an unmanned aerial vehicle to be dispatched for servicing the deployed cable. In this way, the system 110 may service the deployed cable at locations that may be restricted by automobile traffic, traffic controls, inaccessible roadways, and/or unnavigable terrain, among other examples, thereby conserving resources that would otherwise would have been utilized servicing the deployed cable at the locations in a more expensive or more time-consuming manner (e.g., with larger and/or heavier vehicles, slower vehicles, and/or less direct routes, among other examples).

In some implementations, the one or more actions include the system 110 causing a technician to be dispatched for servicing the deployed cable. For example, the system 110 may automatically identify an available technician nearest to the alarm condition and may instruct the technician to travel to the alarm condition and service the deployed cable. In this way, the system 110 may enable servicing of the deployed cable, thereby conserving resources (e.g., computing resources, networking resources, and/or the like) that would otherwise have been utilized in scheduling a repair service, assigning a technician for the repair service, and/or the like.

In some implementations, the one or more actions include the system 110 causing an order for new fiber cable to be placed for repairing the deployed cable. For example, the system 110 may automatically invoke a provider of fiber cable to deliver the new fiber cable to the location of the alarm condition. In some implementations, the system 110 may cause the new fiber cable to be autonomously delivered to the location of the alarm condition. In this way, the system 110 may automatically cause the new fiber cable to be provided at the location that requires the new fiber cable for repairing the deployed cable.

In some implementations, the one or more actions include the system 110 redirecting network traffic from the deployed cable to another fiber cable. For example, the system 110 may identify network traffic associated with the deployed cable, and may identify another fiber cable that is available and can handle the network traffic. The system 110 may then redirect the network traffic to the other fiber cable. In this way, the system 110 may temporarily utilize the other fiber cable for the network traffic, thereby conserving resources that would otherwise have been utilized in identifying lost network traffic, attempting to recover the lost network traffic, and/or the like.

The one or more actions may include the system 110 providing the location of the alarm condition to a requesting system or as part of an alerting message or other transmission. The location of the alarm condition may, in some implementations, include the geographic location and an additional distance from the geographic location.

In this way, several different stages of the process for identifying locations of deployed cables are automated and performed without disruption to physical environment or network operations, which may remove waste from the process, and improve speed and efficiency of the process and conserve computing resources, networking resources, and/or the like. Furthermore, implementations described herein use a rigorous, computerized process to perform tasks or roles that were not previously performed or were previously performed using subjective human intuition or input. For example, currently there does not exist a technique that accurately identifies locations of deployed fiber cables in the manner described herein. Finally, the process for identifying locations of deployed cables conserves computing resources, networking resources, transportation resources, human resources, and/or the like that would otherwise have been utilized in identifying an incorrect location of a fault in a deployed cable, traveling to the incorrect location, re-identifying a correct location of the fault in the deployed cable, recovering lost network traffic, and/or the like.

As indicated above, FIGS. 1A-1M are provided as an example. Other examples may differ from what is described with regard to FIGS. 1A-1M. The number and arrangement of devices shown in FIGS. 1A-1M are provided as an example. In practice, there may be additional devices, fewer devices, different devices, or differently arranged devices than those shown in FIGS. 1A-1M. Furthermore, two or more devices shown in FIGS. 1A-1M may be implemented within a single device, or a single device shown in FIGS. 1A-1M may be implemented as multiple, distributed devices. Additionally, or alternatively, a set of devices (e.g., one or more devices) shown in FIGS. 1A-1M may perform one or more functions described as being performed by another set of devices shown in FIGS. 1A-1M.

Figure 2:
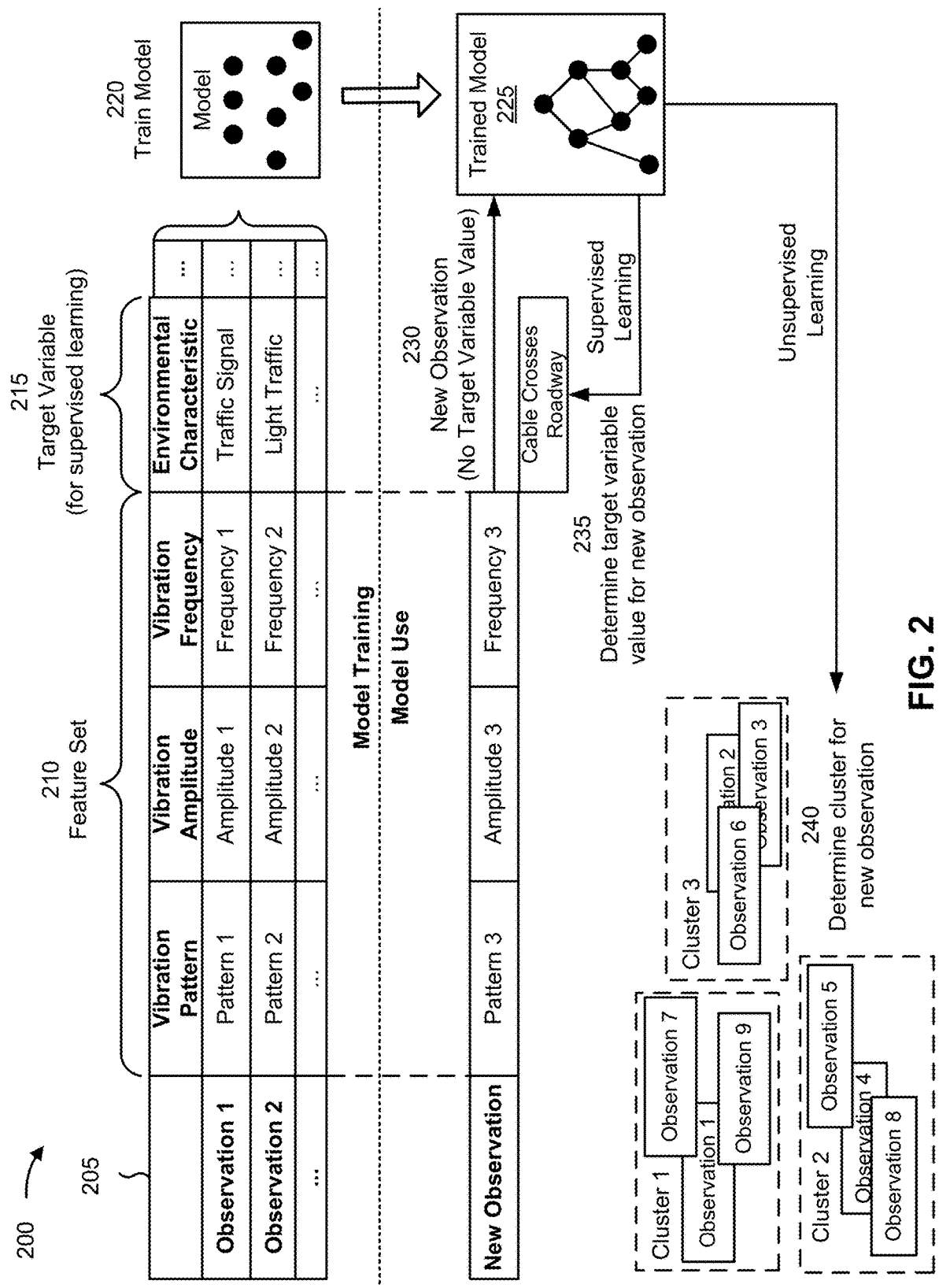
FIG. 2 is a diagram illustrating an example of training and using a machine learning model in connection with identifying locations of deployed cables.

FIG. 2 is a diagram illustrating an example 200 of training and using a machine learning model in connection with identifying locations of deployed cables. The machine learning model training and usage described herein may be performed using a machine learning system. The machine learning system may include or may be included in a computing device, a server, a cloud computing environment, or the like, such as the system 110 described in more detail elsewhere herein.

As shown by reference number 205, a machine learning model may be trained using a set of observations. The set of observations may be obtained from training data (e.g., historical data), such as data gathered during one or more processes described herein. In some implementations, the machine learning system may receive the set of observations (e.g., as input) from the system 110 and/or the sensor device 115, as described elsewhere herein.

As shown by reference number 210, the set of observations includes a feature set. The feature set may include a set of variables, and a variable may be referred to as a feature. A specific observation may include a set of variable values (or feature values) corresponding to the set of variables. In some implementations, the machine learning system may determine variables for a set of observations and/or variable values for a specific observation based on input received from the system 110. For example, the machine learning system may identify a feature set (e.g., one or more features and/or feature values) by extracting the feature set from structured data, by performing natural language processing to extract the feature set from unstructured data, and/or by receiving input from an operator.

As an example, a feature set for a set of observations may include a first feature of vibration pattern, a second feature of vibration amplitude, a third feature of vibration frequency, and so on. As shown, for a first observation, the first feature may have a value of pattern 1, the second feature may have a value of amplitude 1, the third feature may have a value of frequency 1, and so on. These features and feature values are provided as examples, and may differ in other examples.

As shown by reference number 215, the set of observations may be associated with a target variable. The target variable may represent a variable having a numeric value, may represent a variable having a numeric value that falls within a range of values or has some discrete possible values, may represent a variable that is selectable from one of multiple options (e.g., one of multiples classes, classifications, or labels) and/or may represent a variable having a Boolean value. A target variable may be associated with a target variable value, and a target variable value may be specific to an observation. In example 200, the target variable is environmental characteristic, which has a value of traffic signal for the first observation. The feature set and target variable described above are provided as examples, and other examples may differ from what is described above.

The target variable may represent a value that a machine learning model is being trained to predict, and the feature set may represent the variables that are input to a trained machine learning model to predict a value for the target variable. The set of observations may include target variable values so that the machine learning model can be trained to recognize patterns in the feature set that lead to a target variable value. A machine learning model that is trained to predict a target variable value may be referred to as a supervised learning model.

In some implementations, the machine learning model may be trained on a set of observations that do not include a target variable. This may be referred to as an unsupervised learning model. In this case, the machine learning model may learn patterns from the set of observations without labeling or supervision, and may provide output that indicates such patterns, such as by using clustering and/or association to identify related groups of items within the set of observations.

As shown by reference number 220, the machine learning system may train a machine learning model using the set of observations and using one or more machine learning algorithms, such as a regression algorithm, a decision tree algorithm, a neural network algorithm, a k-nearest neighbor algorithm, a support vector machine algorithm, or the like. After training, the machine learning system may store the machine learning model as a trained machine learning model 225 to be used to analyze new observations.

As shown by reference number 230, the machine learning system may apply the trained machine learning model 225 to a new observation, such as by receiving a new observation and inputting the new observation to the trained machine learning model 225. As shown, the new observation may include a first feature of vibration pattern, a second feature of vibration amplitude, a third feature of vibration frequency, and so on, as an example. The machine learning system may apply the trained machine learning model 225 to the new observation to generate an output (e.g., a result). The type of output may depend on the type of machine learning model and/or the type of machine learning task being performed. For example, the output may include a predicted value of a target variable, such as when supervised learning is employed. Additionally, or alternatively, the output may include information that identifies a cluster to which the new observation belongs and/or information that indicates a degree of similarity between the new observation and one or more other observations, such as when unsupervised learning is employed.

As an example, the trained machine learning model 225 may predict a value of cable crosses roadway for the target variable of environmental condition for the new observation, as shown by reference number 235. Based on this prediction, the machine learning system may provide a first recommendation, may provide output for determination of a first recommendation, may perform a first automated action, and/or may cause a first automated action to be performed (e.g., by instructing another device to perform the automated action), among other examples.

In some implementations, the trained machine learning model 225 may classify (e.g., cluster) the new observation in a cluster, as shown by reference number 240. The observations within a cluster may have a threshold degree of similarity. As an example, if the machine learning system classifies the new observation in a first cluster (e.g., a crosses roadway cluster), then the machine learning system may provide a first recommendation. Additionally, or alternatively, the machine learning system may perform a first automated action and/or may cause a first automated action to be performed (e.g., by instructing another device to perform the automated action) based on classifying the new observation in the first cluster.

As another example, if the machine learning system were to classify the new observation in a second cluster (e.g., a traffic signal cluster), then the machine learning system may provide a second (e.g., different) recommendation and/or may perform or cause performance of a second (e.g., different) automated action.

In some implementations, the recommendation and/or the automated action associated with the new observation may be based on a target variable value having a particular label (e.g., classification or categorization), may be based on whether a target variable value satisfies one or more thresholds (e.g., whether the target variable value is greater than a threshold, is less than a threshold, is equal to a threshold, falls within a range of threshold values, or the like), and/or may be based on a cluster in which the new observation is classified.

The recommendations, actions, and clusters described above are provided as examples, and other examples may differ from what is described above.

In this way, the machine learning system may apply a rigorous and automated process to identifying locations of deployed cables. The machine learning system enables recognition and/or identification of tens, hundreds, thousands, or millions of features and/or feature values for tens, hundreds, thousands, or millions of observations, thereby increasing accuracy and consistency and reducing delay associated with identifying locations of deployed cables relative to requiring computing resources to be allocated for tens, hundreds, or thousands of operators to manually identify locations of deployed cables using the features or feature values.

As indicated above, FIG. 2 is provided as an example. Other examples may differ from what is described in connection with FIG. 2.

Figure 3:
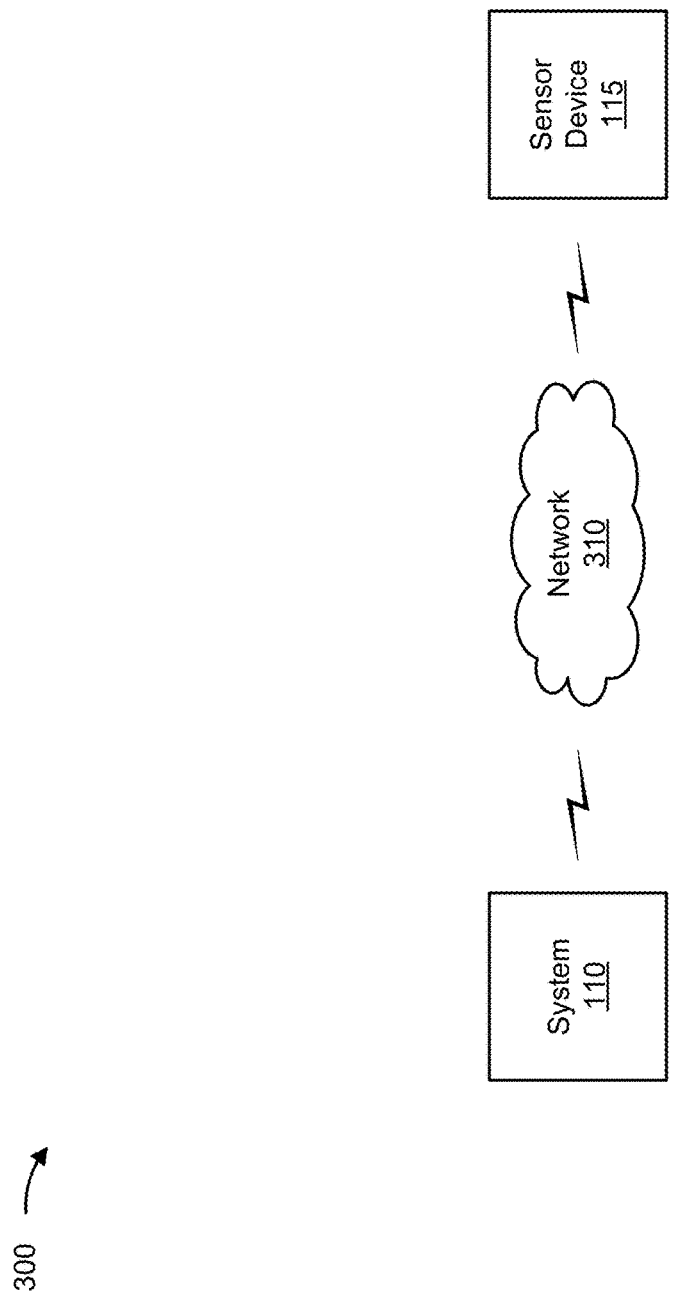
FIG. 3 is a diagram of an example environment in which systems and/or methods described herein may be implemented.

FIG. 3 is a diagram of an example environment 300 in which systems and/or methods described herein may be implemented. As shown in FIG. 3, environment 300 may include a system 110, a sensor device 115, and a network 310. Devices of environment 300 may interconnect via wired connections, wireless connections, or a combination of wired and wireless connections.

The system 110 includes one or more devices capable of receiving, generating, storing, processing, providing, and/or routing information associated with identifying locations of deployed cable, as described elsewhere herein. The system 110 may include a communication device and/or a computing device. In some implementations, the system 110 may be included in the sensor device 115. Alternatively, and/or additionally, the system 110 may be included in another device. For example, the system 110 may be included in a server, such as an application server, a client server, a web server, a database server, a host server, a proxy server, a virtual server (e.g., executing on computing hardware), or a server in a cloud computing system. In some implementations, the system 110 includes computing hardware used in a cloud computing environment.

The sensor device 115 may include one or more devices capable of receiving, generating, storing, processing, and/or providing information, such as information described herein. For example, as noted above, the sensor device 115 may include optical components, including a distributed optical fiber sensing device—such as a distributed optical fiber acoustic sensing device that uses a fiber cable to provide distributed strain sensing, where the fiber cable is a sensing element and vibration measurements are made using an optoelectronic device. The distributed optical fiber sensing device may include a Rayleigh scattering-based distributed optical fiber acoustic sensing device. The sensor device 115 may further include an optical reflectometry device, such as an OTDR device. The optical reflectometry device may be used with the distributed optical sensing device to perform acoustical sensing of vibrations applied to and experienced by a fiber optic cable. The sensor device 115 may also include or be associated with a processing system, such as a laptop computer, a tablet computer, a desktop computer, a handheld computer, or a similar type of device, that determines vibration measurements and fiber cable distances to detected vibrations. In some implementations, the sensor device 115 may receive information from and/or transmit information to the system 110 through a communication channel between them, such as the network 310.

The network 310 includes one or more wired and/or wireless networks. For example, the network 310 may include a wired network that includes a physical communication link between the system 110 and the sensor device 115. Alternatively, and/or additionally, the network 310 may include a wireless wide area network (e.g., a cellular network or a public land mobile network), a local area network (e.g., a wired local area network or a wireless local area network (WLAN), such as a Wi-Fi network), a personal area network (e.g., a Bluetooth network), a near-field communication network, a telephone network, a private network, the Internet, and/or a combination of these or other types of networks. The network 310 enables communication among the devices of environment 300.

The number and arrangement of devices and networks shown in FIG. 3 are provided as an example. In practice, there may be additional devices and/or networks, fewer devices and/or networks, different devices and/or networks, or differently arranged devices and/or networks than those shown in FIG. 3. Furthermore, two or more devices shown in FIG. 3 may be implemented within a single device, or a single device shown in FIG. 3 may be implemented as multiple, distributed devices. Additionally, or alternatively, a set of devices (e.g., one or more devices) of environment 300 may perform one or more functions described as being performed by another set of devices of environment 300.

Figure 4:
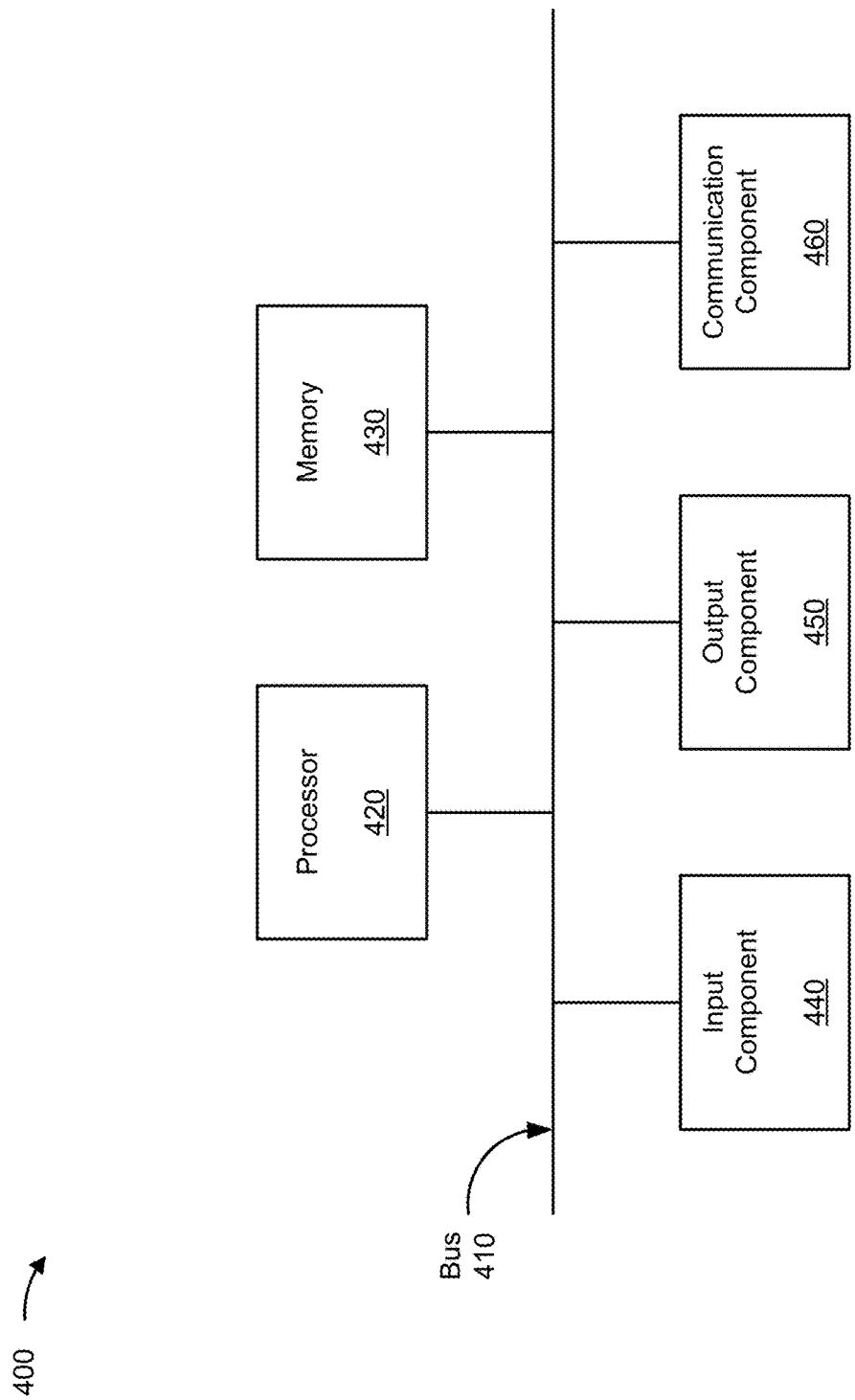
FIG. 4 is a diagram of example components of one or more devices of FIG. 3.

FIG. 4 is a diagram of example components of a device 400, which may correspond to the system 110 and/or the sensor device 115. In some implementations, the system 110 and/or the sensor device 115 may include one or more devices 400 and/or one or more components of device 400. As shown in FIG. 4, device 400 may include a bus 410, a processor 420, a memory 430, an input component 440, an output component 450, and a communication component 460.

Bus 410 includes one or more components that enable wired and/or wireless communication among the components of device 400. Bus 410 may couple together two or more components of FIG. 4, such as via operative coupling, communicative coupling, electronic coupling, and/or electric coupling. Processor 420 includes a central processing unit, a graphics processing unit, a microprocessor, a controller, a microcontroller, a digital signal processor, a field-programmable gate array, an application-specific integrated circuit, and/or another type of processing component. Processor 420 is implemented in hardware, firmware, or a combination of hardware and software. In some implementations, processor 420 includes one or more processors capable of being programmed to perform one or more operations or processes described elsewhere herein.

Memory 430 includes volatile and/or nonvolatile memory. For example, memory 430 may include random access memory (RAM), read only memory (ROM), a hard disk drive, and/or another type of memory (e.g., a flash memory, a magnetic memory, and/or an optical memory). Memory 430 may include internal memory (e.g., RAM, ROM, or a hard disk drive) and/or removable memory (e.g., removable via a universal serial bus connection). Memory 430 may be a non-transitory computer-readable medium. Memory 430 stores information, instructions, and/or software (e.g., one or more software applications) related to the operation of device 400. In some implementations, memory 430 includes one or more memories that are coupled to one or more processors (e.g., processor 420), such as via bus 410.

Input component 440 enables device 400 to receive input, such as user input and/or sensed input. For example, input component 440 may include a touch screen, a keyboard, a keypad, a mouse, a button, a microphone, a switch, a sensor, a global positioning system sensor, an accelerometer, a gyroscope, and/or an actuator. Output component 450 enables device 400 to provide output, such as via a display, a speaker, and/or a light-emitting diode. Communication component 460 enables device 400 to communicate with other devices via a wired connection and/or a wireless connection. For example, communication component 460 may include a receiver, a transmitter, a transceiver, a modem, a network interface card, and/or an antenna.

Device 400 may perform one or more operations or processes described herein. For example, a non-transitory computer-readable medium (e.g., memory 430) may store a set of instructions (e.g., one or more instructions or code) for execution by processor 420. Processor 420 may execute the set of instructions to perform one or more operations or processes described herein. In some implementations, execution of the set of instructions, by one or more processors 420, causes the one or more processors 420 and/or the device 400 to perform one or more operations or processes described herein. In some implementations, hardwired circuitry may be used instead of or in combination with the instructions to perform one or more operations or processes described herein. Additionally, or alternatively, processor 420 may be configured to perform one or more operations or processes described herein. Thus, implementations described herein are not limited to any specific combination of hardware circuitry and software.

The number and arrangement of components shown in FIG. 4 are provided as an example. Device 400 may include additional components, fewer components, different components, or differently arranged components than those shown in FIG. 4. Additionally, or alternatively, a set of components (e.g., one or more components) of device 400 may perform one or more functions described as being performed by another set of components of device 400.

Figure 5:
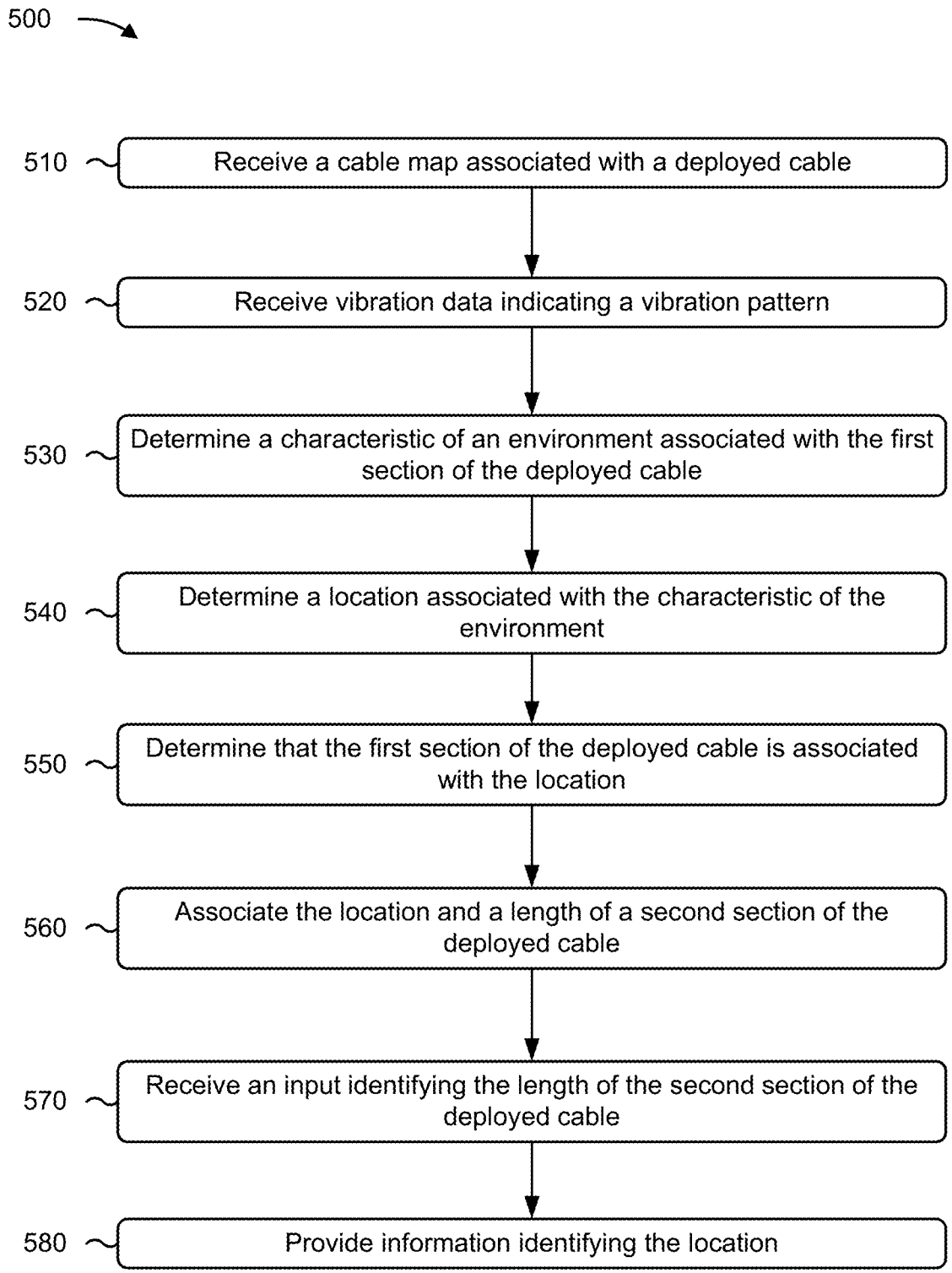
FIG. 5 is a flowchart of an example process relating to identifying locations of deployed cables.

FIG. 5 is a flowchart of an example process 500 associated with identifying deployed cables. In some implementations, one or more process blocks of FIG. 5 may be performed by a device (e.g., the system 110). In some implementations, one or more process blocks of FIG. 5 may be performed by another device or a group of devices separate from or including the device, such as a sensor device (e.g., the sensor device 115). Additionally, or alternatively, one or more process blocks of FIG. 5 may be performed by one or more components of device 400, such as processor 420, memory 430, input component 440, output component 450, and/or communication component 460.

As shown in FIG. 5, process 500 may include receiving a cable map associated with a deployed cable (block 510). For example, the device may receive cable map data corresponding to a cable map associated with a deployed cable, as described above.

As further shown in FIG. 5, process 500 may include receiving vibration data indicating a vibration pattern (block 520). For example, the device may receive vibration data indicating a vibration pattern associated with a first section of the deployed cable, as described above.

As further shown in FIG. 5, process 500 may include determining a characteristic of an environment associated with the first section of the deployed cable (block 530). For example, the device may determine a characteristic of an environment associated with the first section of the deployed cable based on the vibration pattern, as described above.

As further shown in FIG. 5, process 500 may include determining a location associated with the characteristic of the environment (block 540). For example, the device may determine a location associated with the characteristic of the environment based on the cable map data, as described above.

As further shown in FIG. 5, process 500 may include determining that the first section of the deployed cable is associated with the location (block 550). For example, the device may determine that the first section of the deployed cable is associated with the location based on the location being associated with the characteristic of the environment, as described above. The characteristic of the environment may include a volume of vehicle traffic associated with the environment, a direction of the vehicle traffic, and/or a presence of a traffic signal within the environment, among other examples.

In some implementations, the device determines the characteristic of the environment based on providing the vibration data as an input to a machine learning model to generate an output. The output may indicate the characteristic of the environment.

As further shown in FIG. 5, process 500 may include associating the location and a length of a second section of the deployed cable (block 560). For example, the device may generate cable map data that associates the location and a length of a second section of the deployed cable, as described above. In some implementations, the second section of the deployed cable extends from an initial location (e.g., a location of the system 110, a location of the sensor device 115, and/or a location of a central office, among other examples) to the location. In some implementations, the second section of the deployed cable is adjacent to the first section of the deployed cable. In some implementations, the second section of the deployed cable may include the first section of the deployed cable.

In some implementations, the device may determine a geographical distance from the initial location to the location based on the cable map data. The device may determine a difference between the length of the second section of the deployed cable and the geographical distance from the initial location to the location. The device may determine an amount of cable included in a slack loop based on the difference between the length of the second section of the deployed cable and the geographical distance from the initial location to the location. In some implementations, the device may include information identifying a location of the slack loop and/or the amount of cable included in the slack loop in the cable map data.

As further shown in FIG. 5, process 500 may include receiving an input identifying the length of the second section of the deployed cable (block 570). For example, the device may receive an input identifying the length of the second section of the deployed cable, as described above.

As further shown in FIG. 5, process 500 may include providing information identifying the location (block 580). For example, the device may provide information identifying the location based on associating the location and the length of the second section of the deployed cable, as described above.

In some implementations, the device determines a geographical distance from the initial location to the location based on the cable map data. The device may modify the cable map to include information associating the location with information identifying the length of the second section of the deployed cable and/or a difference between the length of the second section of the deployed cable and the geographical distance from the initial location to the location.

Although FIG. 5 shows example blocks of process 500, in some implementations, process 500 may include additional blocks, fewer blocks, different blocks, or differently arranged blocks than those depicted in FIG. 5. Additionally, or alternatively, two or more of the blocks of process 500 may be performed in parallel.

As used herein, the term "component" is intended to be broadly construed as hardware, firmware, or a combination of hardware and software. It will be apparent that systems and/or methods described herein may be implemented in different forms of hardware, firmware, and/or a combination of hardware and software. The actual specialized control hardware or software code used to implement these systems and/or methods is not limiting of the implementations. Thus, the operation and behavior of the systems and/or methods are described herein without reference to specific software code - it being understood that software and hardware can be used to implement the systems and/or methods based on the description herein.

As used herein, satisfying a threshold may, depending on the context, refer to a value being greater than the threshold, greater than or equal to the threshold, less than the threshold, less than or equal to the threshold, equal to the threshold, not equal to the threshold, or the like.

To the extent the aforementioned implementations collect, store, or employ personal information of individuals, it should be understood that such information shall be used in accordance with all applicable laws concerning protection of personal information. Additionally, the collection, storage, and use of such information can be subject to consent of the individual to such activity, for example, through well known "opt-in" or "opt-out" processes as can be appropriate for the situation and type of information. Storage and use of personal information can be in an appropriately secure manner reflective of the type of information, for example, through various encryption and anonymization techniques for particularly sensitive information.

Even though particular combinations of features are recited in the claims and/or disclosed in the specification, these combinations are not intended to limit the disclosure of various implementations. In fact, many of these features may be combined in ways not specifically recited in the claims and/or disclosed in the specification. Although each dependent claim listed below may directly depend on only one claim, the disclosure of various implementations includes each dependent claim in combination with every other claim in the claim set. As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiple of the same item.

No element, act, or instruction used herein should be construed as critical or essential unless explicitly described as such. Also, as used herein, the articles "a" and "an" are intended to include one or more items, and may be used interchangeably with "one or more." Further, as used herein, the article "the" is intended to include one or more items referenced in connection with the article "the" and may be used interchangeably with "the one or more." Furthermore, as used herein, the term "set" is intended to include one or more items (e.g., related items, unrelated items, or a combination of related and unrelated items), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

In the preceding specification, various example embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

What is claimed is:

1. A method, comprising:
   receiving, by a device, vibration data indicating a vibration pattern associated with a first section of a deployed cable;
   determining, by the device, a characteristic of an environment associated with the first section of the deployed cable based on the vibration pattern;
   determining, by the device, a location associated with the characteristic of the environment based on cable map data associated with the deployed cable;
   determining, by the device, that the first section of the deployed cable is associated with the location based on the location being associated with the characteristic of the environment;
   associating, by the device, the location associated with the characteristic of the environment and a length of a second section of the deployed cable,
      wherein the second section of the deployed cable extends from an initial location to the location associated with the characteristic of the environment;
   receiving, by the device, an input identifying the length of the second section of the deployed cable; and
   providing, by the device, information identifying the location associated with the characteristic of the environment based on associating the location associated with the characteristic of the environment and the length of the second section of the deployed cable.

2. The method of claim 1, further comprising:
   determining a geographical distance from the initial location to the location associated with the characteristic of the environment based on the cable map data; and modifying the cable map data to include information associating the location associated with the characteristic of the environment with information identifying one or more of:
  the length of the second section of the deployed cable, or
  a difference between the length of the second section of the deployed cable and the geographical distance from the initial location to the location associated with the characteristic of the environment.

3. The method of claim 1, wherein determining the characteristic of the environment comprises:
  providing the vibration data as an input to a machine learning model to generate an output; and
  determining the characteristic of the environment based on the output.

4. The method of claim 1, wherein the characteristic of the environment includes one or more of:
  a volume of vehicle traffic associated with the environment,
  a direction of the vehicle traffic, or
  a presence of a traffic signal within the environment.

5. The method of claim 1, wherein the first section of the deployed cable is adjacent to the second section of the deployed cable.

6. The method of claim 1, wherein the second section of the deployed cable includes the first section of the deployed cable.

7. The method of claim 1, further comprising:
  determining a geographical distance from the initial location to the location associated with the characteristic of the environment based on the cable map data;
  determining a difference between the length of the second section of the deployed cable and the geographical distance from the initial location to the location associated with the characteristic of the environment; and
  determining an amount of cable included in a slack loop based on the difference between the length of the second section of the deployed cable and the geographical distance from the initial location to the location associated with the characteristic of the environment.

8. A non-transitory computer-readable medium storing a set of instructions, the set of instructions comprising:
  one or more instructions that, when executed by one or more processors of a device, cause the device to:
    receive vibration data indicating a vibration pattern associated with a first section of a deployed cable;
    determine a characteristic of an environment associated with the first section of the deployed cable based on the vibration pattern;
    identify a location associated with the characteristic of the environment based on map data associated with the deployed cable;
    determine that the location associated with the characteristic of the environment is associated with the first section of the deployed cable based on the location being associated with the characteristic of the environment;
    associate the location associated with the characteristic of the environment and a length of a second section of the deployed cable,
      wherein the second section of the deployed cable extends from an initial location to the location associated with the characteristic of the environment;
    receive an input identifying the length of the second section of the deployed cable; and
    provide information identifying the location associated with the characteristic of the environment based on associating the location and the length of the second section of the deployed cable.

9. The non-transitory computer-readable medium of claim 8, wherein the one or more instructions further cause the device to:
  determine a distance from the initial location to the location associated with the characteristic of the environment based on the map data; and
  modify the map data to include information associating the location associated with the characteristic of the environment with information identifying one or more of:
    the length of the second section of the deployed cable, or
    a difference between the length of the second section of the deployed cable and the distance from the initial location to the location associated with the characteristic of the environment.

10. The non-transitory computer-readable medium of claim 8, wherein the one or more instructions, that cause the device to determine the characteristic of the environment, cause the device to:
  provide the vibration data as an input to a machine learning model to generate an output; and
  determine the characteristic of the environment based on the output.

11. The non-transitory computer-readable medium of claim 8, wherein the characteristic of the environment includes one or more of:
  a volume of vehicle traffic associated with the environment,
  a direction of the vehicle traffic, or
  a presence of a traffic signal within the environment.

12. The non-transitory computer-readable medium of claim 8, wherein the characteristic of the environment includes one or more of:
  information indicating that the location associated with the characteristic of the environment is associated with a particular type of cable, or
  information indicating whether the second section of the deployed cable is installed above a surface of the environment.

13. The non-transitory computer-readable medium of claim 8, wherein the one or more instructions further cause the device to:
  determine a distance from the initial location to the location associated with the characteristic of the environment based on the map data associated with the deployed cable;
  determine a difference between the length of the second section of the deployed cable and the distance from the initial location to the location associated with the characteristic of the environment; and
  determine an amount of cable included in a slack loop based on the difference between the length of the second section of the deployed cable and the distance from the initial location to the location associated with the characteristic of the environment.

14. The non-transitory computer-readable medium of claim 13, wherein the one or more instructions further cause the device to:
  modify the map data to associate the location with information associated with the slack loop.

15. A device, comprising:
one or more processors configured to:
- determine cable map data associated with a deployed cable,
  - wherein the cable map data identifies a location associated with the deployed cable;
- receive vibration data indicating a vibration pattern associated with a first section of the deployed cable;
- determine a characteristic of an environment associated with the first section of the deployed cable based on the vibration pattern;
- determine that the location is associated with the first section of the deployed cable based on the characteristic of the environment;
- associate the location and a length of a second section of the deployed cable,
  - wherein the second section of the deployed cable extends from an initial location to the location;
- receive an input identifying the length of the second section of the deployed cable; and
- provide information identifying the location based on associating the location and the length of the second section of the deployed cable.

16. The device of claim 15, wherein the one or more processors are further configured to:
- determine a distance from the initial location to the location based on the cable map data; and
- modify the cable map data to include information associating the location with information identifying one or more of:
  - the length of the second section of the deployed cable, or
  - a difference between the length of the second section of the deployed cable and the distance from the initial location to the location.

17. The device of claim 15, wherein the one or more processors, to determine the characteristic of the environment, are configured to:
- provide the vibration data as an input to a machine learning model to generate an output; and
- determine the characteristic of the environment based on the output.

18. The device of claim 15, wherein the characteristic of the environment includes one or more of:
- a volume of vehicle traffic associated with the environment,
- a direction of the vehicle traffic, or
- a presence of a traffic signal within the environment.

19. The device of claim 15, wherein the characteristic of the environment includes one or more of:
- information indicating that the location is associated with a particular type of cable, or
- information indicating whether the second section of the deployed cable is installed above a surface of the environment.

20. The device of claim 15, wherein the one or more processors are further configured to:
- determine a difference between the length of the second section of the deployed cable and a distance from the initial location to the location; and
- determine an amount of cable included in a slack loop based on the difference between the length of the second section of the deployed cable and the distance from the initial location to the location.

* * * * *